United States Patent
Lee et al.

(10) Patent No.: US 10,425,916 B2
(45) Date of Patent: Sep. 24, 2019

(54) METHOD FOR TRANSMITTING V2X SIGNAL OF TERMINAL HAVING LIMITED TRANSMISSION CAPABILITY AND TERMINAL USING THE METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/048,969

(22) Filed: Jul. 30, 2018

(65) Prior Publication Data

US 2018/0338300 A1 Nov. 22, 2018

Related U.S. Application Data

(62) Division of application No. 15/976,385, filed on May 10, 2018.

(Continued)

(30) Foreign Application Priority Data

Mar. 13, 2018 (KR) ........................ 10-2018-0029347
May 9, 2018 (KR) ........................ 10-2018-0053130

(51) Int. Cl.
*H04W 72/02* (2009.01)
*H04W 4/40* (2018.01)
(Continued)

(52) U.S. Cl.
CPC ............. *H04W 72/02* (2013.01); *H04L 67/12* (2013.01); *H04L 69/14* (2013.01); *H04W 4/40* (2018.02);
(Continued)

(58) Field of Classification Search
None
See application file for complete search history.

(56) References Cited

U.S. PATENT DOCUMENTS

2014/0321437 A1* 10/2014 Wong ................ H04W 74/0833
370/336
2018/0262887 A1* 9/2018 Futaki ................... H04W 48/20

FOREIGN PATENT DOCUMENTS

| KR | 1020160018283 A | 2/2016 |
|----|----|----|
| KR | 1020160122263 A | 10/2016 |
| KR | 1020170020853 A | 2/2017 |

OTHER PUBLICATIONS

Intel Corporation, "Details of random resource selection by pedestrian UEs," 3GPP TSG RAN WG1 Meeting #88, Feb. 13-17, 2017, R1-1702140.

(Continued)

*Primary Examiner* — Yaotang Wang
(74) *Attorney, Agent, or Firm* — Dentons US LLP

(57) ABSTRACT

Provided are a method for transmitting a vehicle-to-everything (V2X) signal performed by a user equipment (UE) having a limited transmission capability in a multi-carrier system and a UE using the method. The method includes selecting a first resource in a first carrier, if using a specific subframe in a second carrier exceeds a transmission capability of the UE considering the first resource, selecting a second resource randomly among the remaining subframes except the specific subframe in the second carrier and transmitting the V2X signal using the first resource and the second resource.

12 Claims, 14 Drawing Sheets

Related U.S. Application Data

(60) Provisional application No. 62/544,762, filed on Aug. 11, 2017, provisional application No. 62/571,170, filed on Oct. 11, 2017, provisional application No. 62/570,115, filed on Oct. 10, 2017, provisional application No. 62/571,281, filed on Oct. 12, 2017, provisional application No. 62/588,136, filed on Nov. 17, 2017, provisional application No. 62/631,493, filed on Feb. 15, 2018, provisional application No. 62/505,850, filed on May 13, 2017.

(51) Int. Cl.
*H04W 72/00* (2009.01)
*H04W 72/04* (2009.01)
*H04L 29/08* (2006.01)
*H04L 29/06* (2006.01)
*H04W 8/00* (2009.01)

(52) U.S. Cl.
CPC ....... *H04W 72/005* (2013.01); *H04W 72/048* (2013.01); *H04W 8/005* (2013.01)

(56) References Cited

OTHER PUBLICATIONS

Intel Corporation, "Sidelink carrier aggregation for LTE V2V communication," 3GPP TSG RAN WG1 Meeting #89, May 15-19, 2017, R1-1707300.

* cited by examiner

METHOD FOR TRANSMITTING V2X SIGNAL OF TERMINAL HAVING LIMITED TRANSMISSION CAPABILITY AND TERMINAL USING THE METHOD

CROSS-REFERENCE TO RELATED APPLICATIONS

This application is a divisional of U.S. patent application Ser. No. 15/976,385 filed on May 10, 2018, which claims the benefit of U.S. Provisional Applications No. 62/505,850 filed on May 13, 2017, No. 62/544,762 filed on Aug. 11, 2017, No. 62/571,170 filed on Oct. 11, 2017, No. 62/570,115 filed on Oct. 10, 2017, No. 62/571,281 filed on Oct. 12, 2017, No. 62/588,136 filed on Nov. 17, 2017, No. 62/631,493 filed on Feb. 15, 2018, priority of Korean Patent Application No. 10-2018-0029347 filed on Mar. 13, 2018, and priority of Korean Patent Application No. 10-2018-0053130 filed on May 9, 2018, the contents of which are all hereby incorporated by reference herein in their entirety.

BACKGROUND OF THE INVENTION

Field of the Invention

The present invention relates to wireless communications, and more particularly, to a method for a terminal having limited transmission capability to transmit V2X signals and a terminal using the method.

Background Art

There is a growing interest in a Device-to-Device (D22) technology in which devices perform direct communication. In particular, D2D has been in the spotlight as a communication technology for a public safety network. The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, in long term evolution-advanced (LTE-A), an interface between a terminal and a terminal is referred to as sidelink, and the sidelink may also be used for a communication between terminals installed on vehicles or between a terminal installed on a vehicle and another arbitrary terminal, that is, vehicle-to-everything (V2X) communication.

The conventional V2X communication does not support the carrier aggregation. The carrier aggregation means that carriers can be used in combination, and is classified into an aggregation of contiguous carriers and an aggregation of non-contiguous carriers.

When the carrier aggregation is used in the V2X communication, a terminal may transmit V2X signals by using a plurality of carriers. However, a terminal is not always able to transmit V2X signals simultaneously in all carriers that are configured. For example, in the case that the number of transmission chains that are provided is less than the number of carriers that are configured, the terminal is not able to support the transmission of V2X signals simultaneously in all of the configured carriers.

In the case that the carrier aggregation is used for the V2X communication with respect to the terminal that has such a limited transmission capability, it becomes a problem the way of selecting a transport resource by the terminal.

SUMMARY OF THE INVENTION

An object of the present invention is to provide a method for transmitting a V2X signal by a terminal that has a limited transmission capability in a multi-carrier system and a terminal using the method.

In one aspect, provided is a method for transmitting a vehicle-to-everything (V2X) signal performed by a user equipment (UE) having a limited transmission capability in a multi-carrier system. The method includes selecting a first resource in a first carrier, if using a specific subframe in a second carrier exceeds a transmission capability of the UE considering the first resource, selecting a second resource randomly among the remaining subframes except the specific subframe in the second carrier and transmitting the V2X signal using the first resource and the second resource.

A number of transmission chains for the UE may be smaller than a number of configured transmission carriers in the specific subframe.

The UE may not support a frequency band combination including the first resource of the first carrier and the second resource of the second carrier.

The specific subframe may correspond to a transmission chain switching time of the UE.

The method may further include receiving V2X configuration information. The V2X configuration information may indicate that a transmission resource is selected in an order of the first carrier and the second carrier.

The UE may select a transmission resource in an order of the first carrier and the second carrier based on a channel busy ratio (CBR) and a ProSe priority per packet (PPPP) of the V2X signal.

The first carrier and the second carrier may be configured to the UE by carrier aggregation.

In another aspect, provided is a user equipment (UE). The UE includes a transceiver configured to transmit and receive a radio signal and a processor operated in connection with the transceiver. The processor selects a first resource in a first carrier, when a specific subframe used in a second carrier exceeds a transmission capability of the UE considering the first resource, selects a second resource randomly among the remaining subframes except the specific subframe in the second carrier and transmits the V2X signal using the first resource and the second resource.

According to the present invention, when the carrier aggregation is used in a V2X communication, a transmission resource is selected efficiently on a plurality of carriers by considering a transmission capability of a terminal.

DESCRIPTION OF EXEMPLARY EMBODIMENTS

Figure 1:
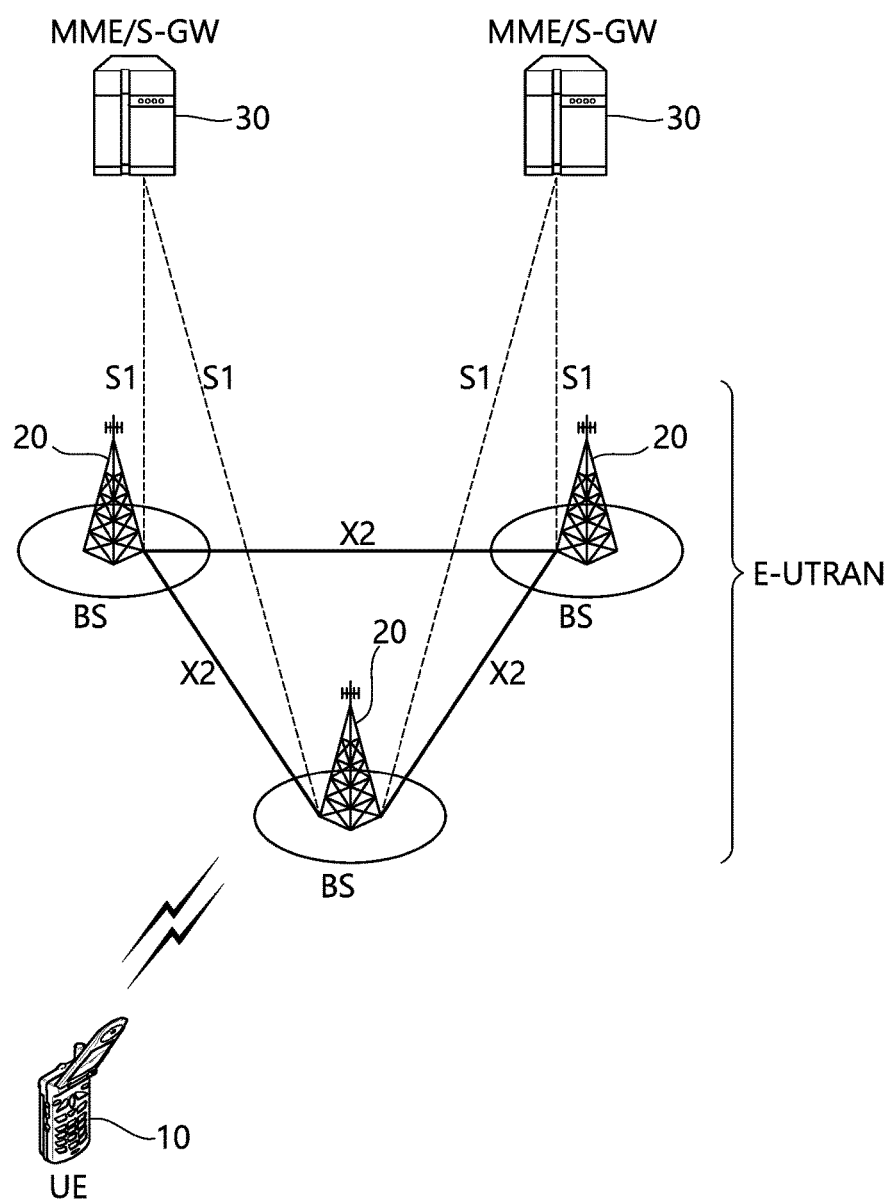
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

A wireless communication system may be a time division duplex (TDD) system, a frequency division duplex (FDD) system or a system in which the TDD and the FDD are used in mixed manner.

Figure 2:
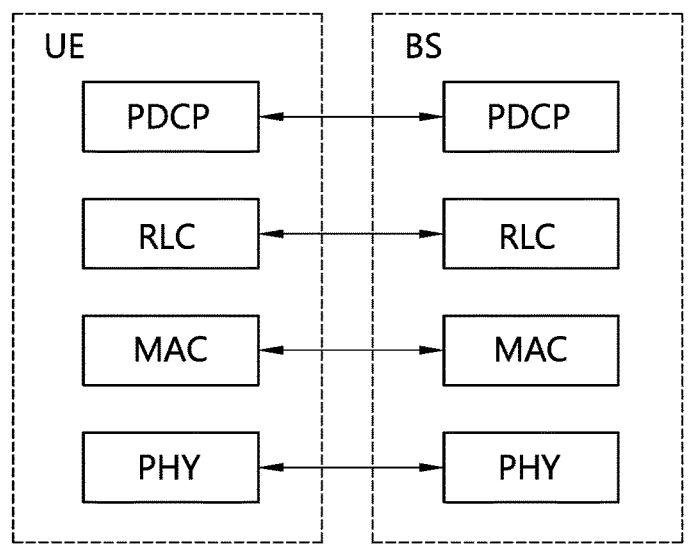
FIG. 2 is a diagram showing a wireless protocol architecture for a user plane.
Figure 3:
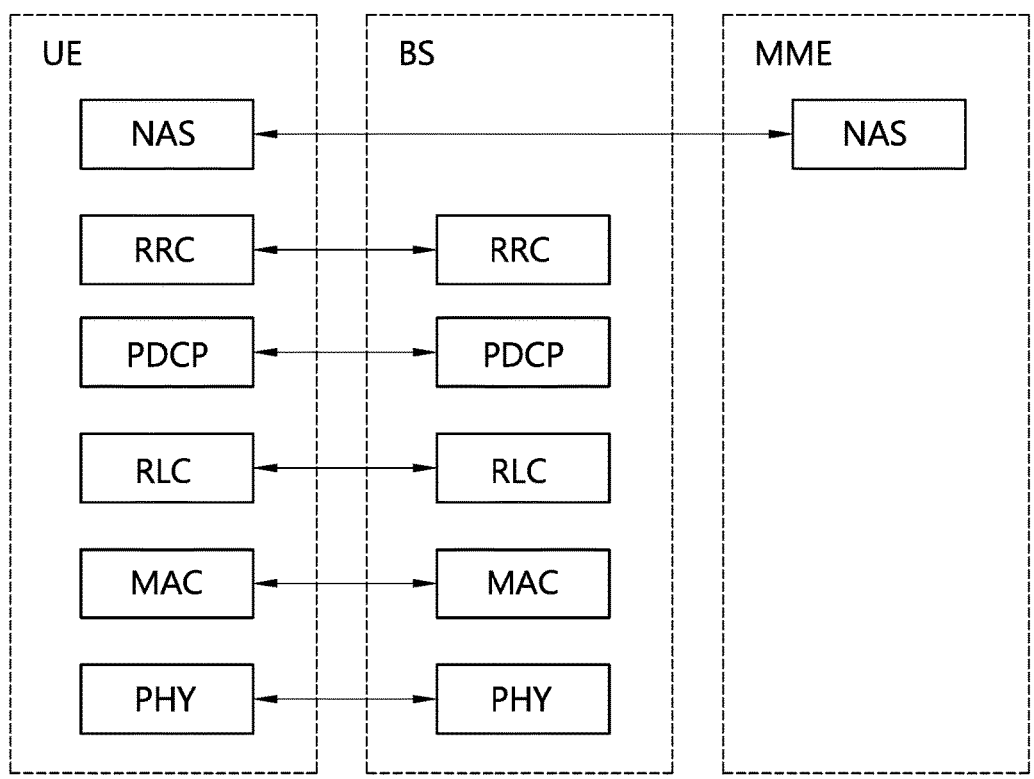
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of 01-DM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

Now, the D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery. The link used for a D2D operation is referred to as sidelink in LTE.

Now, a vehicle to everything (V2X) communication is described. The V2X means a communication between a UE installed on a vehicle and another UE, and another UE may correspond to a pedestrian, a vehicle or an infrastructure. In this case, these may be referred to as a vehicle to pedestrian (V2P), a vehicle to vehicle (V2V) and a vehicle to infrastructure (V2I), respectively.

The V2X communication transmits/receives data/control information through sidelink defined in a D2D operation, not through uplink/downlink between an eNB and a UE, which is used in the conventional LTE communication.

The following physical channels may be defined in sidelink as below.

Physical Sidelink Broadcast CHannel (PSBCH) is a physical sideleink broadcast channel. Physical Sidelink Control CHannel (PSCCH) is a physical sidelink control channel. Physical Sidelink Discovery CHannel is a physical sidelink discovery channel. Physical Sidelink Shared CHannel is a physical sidelink shared channel. Sidelink Synchronization Signal (SLSS) is a sidelink synchronization signal. The SLSS may include Primary Sidelink Synchronization Signal (PSSS) and Secondary Sidelink Synchronization Signal (SSSS). The SLSS and the PSBCH may be transmitted together.

The sidelink may mean an interface between a UE and a UE, and the sidelink may correspond to PC5 interface.

Figure 4:
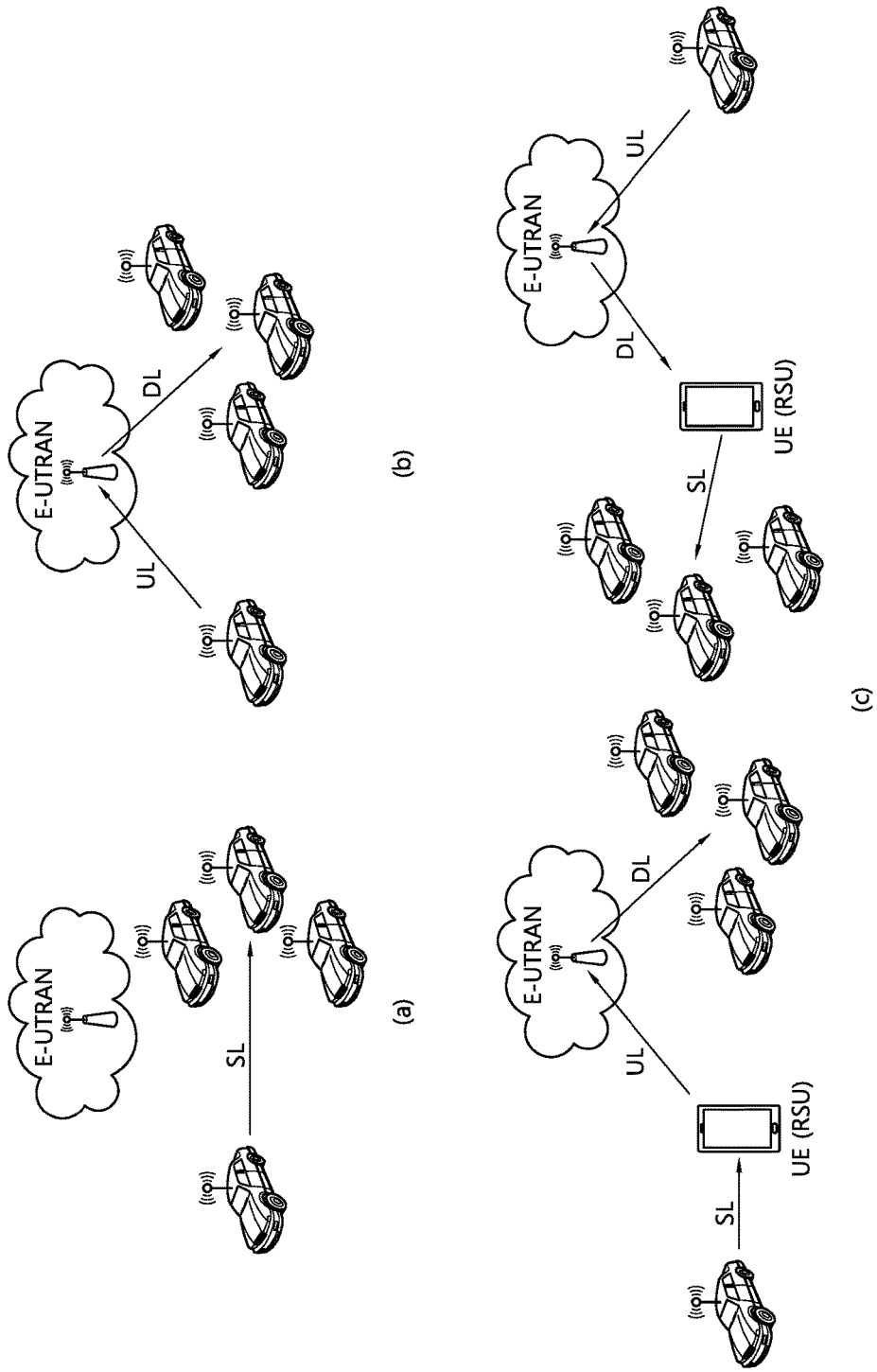
FIG. 4 illustrates scenarios for a V2X communication.

FIG. 4 illustrates scenarios for a V2X communication.

Referring to FIG. 4(a), a V2X communication may support an information exchange operation (between UEs) based on PC5, which is an interface between UEs, and as shown in FIG. 4(b), may also support an information exchange operation (between UEs) based on Uu, which is an interface between an eNodeB and a UE. In addition, as shown in FIG. 4(c), an information exchange operation (between UEs) maybe supported by using both of the PC5 and the Uu.

Hereinafter, for the convenience of description, the present invention is described based on a 3GPP LTE/LTE-A system. However, the scope of the system to which the present invention is applied is extendable to other system in addition to the 3GPP LTE/LTE-A system.

Now, the present invention is described.

The technical proposals below propose a method for a UE that has no capability of performing a simultaneous transmission and/or reception (or a UE that has a limitation in a capability of a simultaneous transmission and/or reception, and hereinafter, such a UE is referred to as 'LCAP_UE') to perform a V2X communication efficiently on a plurality of (V2X) carriers which are configured (/signaled) in the Carrier Aggregation (CA) technique.

(A part of) The technical proposals of the present invention may be limitedly applied under a situation of "contiguous or non-contiguous CA in Intra-B and".

V2X communication modes include (A) a mode (this is referred to as mode #3) in which an eNB signals (/controls) scheduling information in relation to V2X message transmission (/reception) (on V2X resource pool which is pre-configured (/signaled) (from an eNB (/network)) (representatively). In mode 3, for example, a UE located in eNB communication coverage (and/or in RRC_CONNECTED state) is a main target. And/or the V2X communication modes include (B) a mode (this is referred to as mode #4) in which a UE independently determines (/controls) scheduling information in relation to V2X message transmission (/reception) (on V2X resource pool which is preconfigured (/signaled)(from an eNB (/network)). In mode 3, for example, a UE located in/out of eNB communication coverage (and/or in RRC_CONNECTED/RRC_IDEL states) may be a main target.

In the present invention, "sensing operation" may be interpreted as PSSCH-RSRP measurement operation based on PSSCH DM-RS sequence which is scheduled by a PSCCH in which decoding is successful and/or S-RSSI measurement operation based on a sub channel in relation to V2X resource pool.

In the present invention, "reception" may be extendedly interpreted as at least one of:

(A) V2X channel (/signal) (e.g., PSCCH, PSSCH, PSBCH, PSSS/SSSS, etc.) decoding (/reception) operation (and/or WAN DL channel (/signal) (e.g., PDCCH, PDSCH, PSS/SSS, etc.) decoding (/reception) operation, (B) Sensing operation, and (C) CBR measurement operation.

In the present invention, "transmission" may be extendedly interpreted as V2X channel (/signal) (e.g., PSCCH, PSSCH, PSBCH, PSSS/SSSS, etc.) transmission operation (and/or WAN UL channel (/signal) (e.g., PUSCH, PUCCH, SRS, etc.) transmission operation).

In the present invention, "carrier" may be extendedly interpreted as at least one of (A) carrier set (/group) which is configured (/signaled) in advance, (B) V2X resource pool (set (/group)), and (C) time/frequency resource set/group on a carrier.

(A part of) the technical proposals of the present invention may be extendedly applied to a V2X communication of a UE (e.g., a UE having simultaneous transmission and/or reception capability on a plurality of (V2X) carriers that are preconfigured (/signaled) by the CA, of which capability is relatively better than an LCAP_UE).

In the present invention, "synchronization signal" may be extendedly interpreted as it includes "PSBCH" as well as "SLSS". In the present invention, "LCAP_UE" may be extendedly interpreted as at least one of a UE having "limited transmission (chain) capability" and a UE having "limited reception (chain) capability".

Sidelink Received Signal Strength Indicator (S-RSSI), Sidelink Reference Signal Received Power (S-RSRP), Channel busy ratio (CBR) and Channel occupancy ratio (CR) will be described.

First, the S-RSSI is an indicator of reception signal strength in sidelink. The S-RSSI may be defined as a linear average of total reception power for each SC-FDMA symbol in SC-FDMA symbols #1, 2, . . . , 6 of the first slot and SC-FDMA symbols #0, 1, . . . , 5 of a subframe, that a UE observes in a sub channel which is configured.

The S-RSRP means a reception power of a reference signal in sidelink. In the S-RSRP, for example, there is PSSCH-RSRP in which RSRP is calculated in a PSSCH. The PSSCH-RSRP may be defined as a linear average of power contributions of resource elements (REs) that carry a demodulation reference signal (DM-RS) associated with a PSSCH in physical resource blocks (PRBs) that are indicated by an associated PSCCH.

The CBR indicates a busy ratio of a channel, and the CBR measured in subframe n may be defined as below.

The PSSCH is sensed in subframe [n−100, n−1], and indicates a ratio in a resource pool of a sub channel that has an S-RSSI which is measured as exceeding a predefined or preconfigured threshold.

The PSCCH is sensed in subframe [n−100, n−1], and indicates a ratio of resources of a PSCCH pool that has an S-RSSI which is measured as exceeding a predefined or preconfigured threshold in a pool configured such that a PSCCH is transmitted together with the corresponding PSSCH in non-contiguous resource blocks. Here, it is assumed that the PSCCH pool includes resources of a size of two consecutive PRB pairs in a frequency domain.

The CR means a channel occupation rate. The CR calculated in subframe n may be defined as a value total summation of the number of sub channels used for a transmission of itself in subframe [n−a, n−1] and the number of sub channels allowed for a transmission of itself in subframe [n, n+b] divided by the number of sub channels configured in a transmission pool throughout subframe [n−a, n+b].

Here, 'a' is a positive integer and b is 0 or a positive integer. 'a' and 'b' are determined by a UE. 'a' and 'b' are in a relation of a+b+1=1000 and a is 500 or more, and n+b should not exceed the latest transmission opportunity of a grant for a current transmission.

[Proposed method #1] Among a plurality of V2X carriers that are configured (/signaled) by the CA, an LCAP_UE may perform a transmission (and/or reception) operation preferentially, on a carrier is selected according to (a part of) priority information (/rule) which is configured (/signaled) in advance.

(Rule #1-1) (A) Transmission (and/or reception) carrier in relation to a specific service (and/or data (/message (/application type))) which is preconfigured (/signaled) and/or (B) Carrier on which V2X message transmission (and/or reception) operation is performed based on PPPP (and/or (remaining) LATENCY REQUIREMENT) and/or message generation (/transmission (/reception))) Period which is greater (or smaller) than a threshold value))) which is preconfigured (/signaled) (and/or relatively greater (or smaller) and/or resource reservation interval (/period) and/or (C) Transmission (and/or reception) carrier and/or (D) Carrier in which a simultaneous signal transmission (and/or reception) is configured (/signaled) (and/or (time/frequency) synchronization reference carrier in relation to V2X transmission (and/or reception) on other carrier and/or (E) Carrier in which a (specific) SYNCH SOURCE TYPE which is preconfigured (/signaled) has (relatively) higher priority (F) Scheduling (and/or scheduled) carrier in the case that CROSS-CARRIER SCHEDULING (CCS) is configured (/signaled) and/or (G) Transmission (and/or reception) carrier having CBR (/CR) measurement value which is greater (or smaller) than a threshold value which is preconfigured (/signaled)(and/or relatively greater (or smaller)) (and/or (remaining) CR_LIMIT and/or (maximum) (allowed) transmission power) and/or (H) Carrier of higher (or lower) priority which is preconfigured (/signaled) and/or (I) Shared carrier (with WAN (uplink) communication).

(Rule #1-2) In the (Rule #1-1), at least one information of (representative) CBR, CR, (remaining) CR_LIMIT and (maximum allowed) transmission power of a carrier which is used as a carrier (priority) selection criteria may be derived (/defined) as an (weighted) average value of a plurality of (transmission/reception) resource pool related (measurement/configuration) values on a carrier or a maximum value (/minimum value).

As another example, after a carrier is selected based on the (priority) rule described above, among a plurality of (transmission/reception) resource pools on the corresponding carrier which is selected, the criteria (/priority parameter) described above may be (re)applied to a selection of (transmission/reception) pool which is going to be used for V2X message transmission (/reception) actually.

[Proposed method #2] For each carrier, at least one of resource location (/pattern), period and subframe offset information to which a transmission (and/or reception) operation is preferentially performed in comparison with other carrier may be preconfigured or signaled.

As an example, when an LCAP_UE performs at least one of (A) (transmission) resource reservation (/selection) operation, (B) sensing operation (e.g., S-RSSI measurement, PSSCH-RSRP measurement), and (C) CBR measurement operation, the (only) corresponding configuration (/signaling) may used preferentially.

For another example, since the synchronization signal transmission (and/or reception) operation is relatively important for maintaining V2X communication performance, a resource on carrier #Y (partially) overlapped with synchronization signal transmission (and/or reception) resource on carrier #X may not perform sensing operation and/or CBR measurement operation and/or (transmission) resource reservation (/selection) operation and/or V2X message (/channel/signal) transmission (/reception).

As an example, by allocating (/signaling) a specific (virtual) PPPP (P_SYN) (in advance), that of PPPP which is relatively lower than the P_SYN may be omitted during protecting the corresponding synchronization signal reception (/transmission) operation (e.g., V2X message (/channel/signal) reception (/transmission) which is (partially) overlapped with synchronization signal reception (/transmission) resource).

For another example, in order to alleviate synchronization signal transmission power decrease, in the resource on carrier #Y which is (partially) overlapped with the synchronization signal transmission resource on carrier #X, (A) a transmission operation in relation to a specific service (and/or data (/message (/application) type)) which is preconfigured (/signaled) and/or (B) PPPP greater (or smaller) than a threshold value which is preconfigured (/signaled) (e.g., it may be interpreted that (virtual) PPP of the (corresponding) threshold value which is preconfigured (/signaled) (or specific (virtual) PPPP)) may be performed (/allowed) (and/or (remaining) delay requirement and/or message generation (/transmission (/reception)) period and/or resource reservation interval (/period) based V2X message transmission operation only may be performed (/allowed).

[Proposed method #3] In the case that V2X message transmission operation is performed on subframe (SF) #K timing of carrier #A based on the [Proposed method #1] and/or [Proposed method #2] described above, and it is unable to monitor (and/or sense) SF #P of carrier #B which is (partially or entirely) overlapped with the corresponding subframe (i.e., SF #K of carrier A) on a time domain, an LCAP_UE may exclude (all of) candidate (transmission) resources (in a selection window) that may be overlapped (or collided) with a resource which is separated as much as (candidate) resource reservation period once (and/or preconfigured (/signaled) count) from SF #P, when reserving (/selecting) V2X communication related (transmission) resource on carrier #B.

[Proposed method #4] By synchronizing the following (partial) parameters (/configuration) between multiple carriers that are preconfigured (/signaled), an LCAP_UE (or UE) may perform V2X communication efficiently on a plurality of (V2X) carriers which is configured (/signaled) by the CA.

(Rule #4-1) A transmission (and/or reception) resource location (and/or) the number of a synchronization signal (SLSS) (and/or subframe location in relation to V2X resource pool and/or the number (and/or sub channel size and/or the number) may be synchronized among multiple carriers.

In the case that the rule is applied, between the multiple carriers, (sidelink) logical (subframe) index (and/or DFN) (and/or V2X resource pool) in relation to V2X communication may be synchronized (based on ANCHOR CARRIER or synchronization based carrier), and through this, the problem of unable to perform simultaneous transmission and/or reception on multiple (V2X) carriers that are configured (/signaled) by the CA may be solved efficiently. In other words, on multiple carriers, simultaneous transmission (or reception) operation may be efficiently scheduled (/performed).

Figure 5:
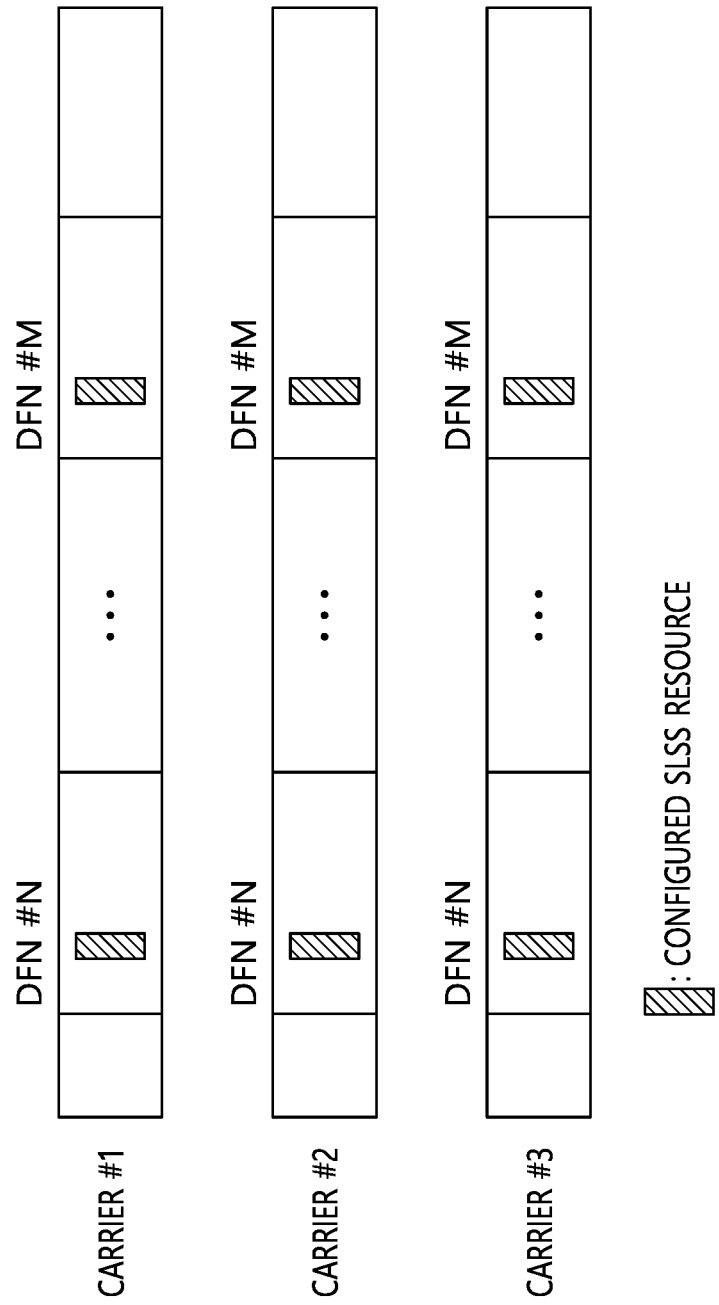
FIG. 5 illustrates an SLSS resource configuration method according to an embodiment of the present invention.

FIG. 5 illustrates an SLSS resource configuration method according to an embodiment of the present invention.

Referring to FIG. 5, with respect to V2X communication, three carriers (carriers #1, 2 and 3) may be configured to a UE by the carrier aggregation.

In this case, the number and the location of SLSS resources may be identically configured between multiple carriers. As shown in FIG. 5, in carriers #1, 2 and 3, the number and the location of configured SLSS resources are identical. The reason of this configuration is designed for setting (sidelink) logical (subframe) indexes (and/or Direct Frame number (DFN)) in relation to V2X communication to be identical in the carriers #1, 2 and 3. That is, the frames overlapped in a time domain in carriers #1, 2 and 3 may have the same (sidelink) logical (subframe) index (and/or DFN) value.

In the aspect of a UE, the UE may assume that the location and the number of SLSS resources are identical in all carriers that are aggregated for V2X communication.

As an example, the carrier (pair) in which the parameters (/configuration) described above are identical (and/or to which the cross carrier scheduling is configured (/signaled) and/or the carrier (pair) that has an identical (time/frequency) synchronization reference carrier) may be (limitedly) configured (/signaled) among (A) a (transmission and/or reception) carrier in relation to (specific) an identical service (and/or data (/message (/application)) type) (preconfigured (/signaled)) and/or (B) a (transmission and/or reception) carrier in which a (specific) an identical synchronization source type (preconfigured (/signaled)) has (relatively) higher priority and/or (C) a carrier (pair) to which CCS is configured (/signaled) and/or a carrier (pair) of which (time/frequency) synchronization difference is smaller than a preconfigured (/signaled) threshold value and/or a (transmission and/or reception) carrier that has (specific) an identical (time/frequency) synchronization reference carrier (preconfigured (/signaled)) and/or a transmission (and/or reception) carrier and/or a carrier to which synchronization signal transmission (and/or reception) is configured (/signaled) and/or a (time/frequency) synchronization reference carrier in relation to V2X transmission (and/or reception) on different carriers.

(Rule #4-2) As an example, in the case of the carrier to which an identical (time/frequency) synchronization reference carrier is configured (/signaled) (this is referred to as a carrier which is not a synchronization reference carrier, and called NON-SYNRFCC), for supporting V2X communication of the existing (LEGACY) UE (e.g., UE operating in accordance with LTE REL-14) on the (corresponding) carrier which is not a synchronization reference carrier (NON-SYNRFCC), a synchronization resource may be configured (/signaled).

As another example, a synchronization resource configuration (/signaling) on the (corresponding) carrier which is not a synchronization reference carrier (non-synchronization reference carrier; NON-SYNRFCC) may be performed for the purpose of synchronizing (sidelink) logical (subframe) indexes (and/or DFN) between a synchronization reference carrier and a non-synchronization reference carrier. For this, the location (/number) of a synchronization resource configured (/signaled) on the non-synchronization reference carrier may be identical to that of the synchronization reference carrier. Alternatively, it may be implemented that the synchronization resource configured (/signaled) on the non-synchronization reference carrier is valid only in the case that the synchronization resource is configured (/signaled) on the synchronization reference carrier.

As an example, in the case of an improved UE (UE operating in accordance with LTE REL-15), according to a network configuration (/signaling), a transmission operation of a synchronization signal (e.g., SLSS) may be performed on a synchronization resource on the non-synchronization reference carrier (NON-SYNRFCC) (as well as the synchronization reference carrier). In this case, even in the case that a synchronization resource is configured on the non-synchronization reference carrier (and/or the synchronization reference carrier), it may be interpreted that a network (finally) instructs (/controls) whether to transmit actual synchronization signal of the improved UE. For example, in the case that a synchronization resource is configured on the synchronization reference carrier, an SLSS may be transmitted in all times by using the synchronization resource. On the contrary, even in the case that a synchronization resource is configured on the non-synchronization reference carrier, a network may control whether to transmit a synchronization signal actually.

The non-synchronization reference carrier on which the (identical) (time/frequency) synchronization reference carrier is configured (/signaled) may be restricted to a (transmission and/or reception) carrier that an identical synchronization source type has (relatively) higher priority than the synchronization reference carrier.

Figure 6:
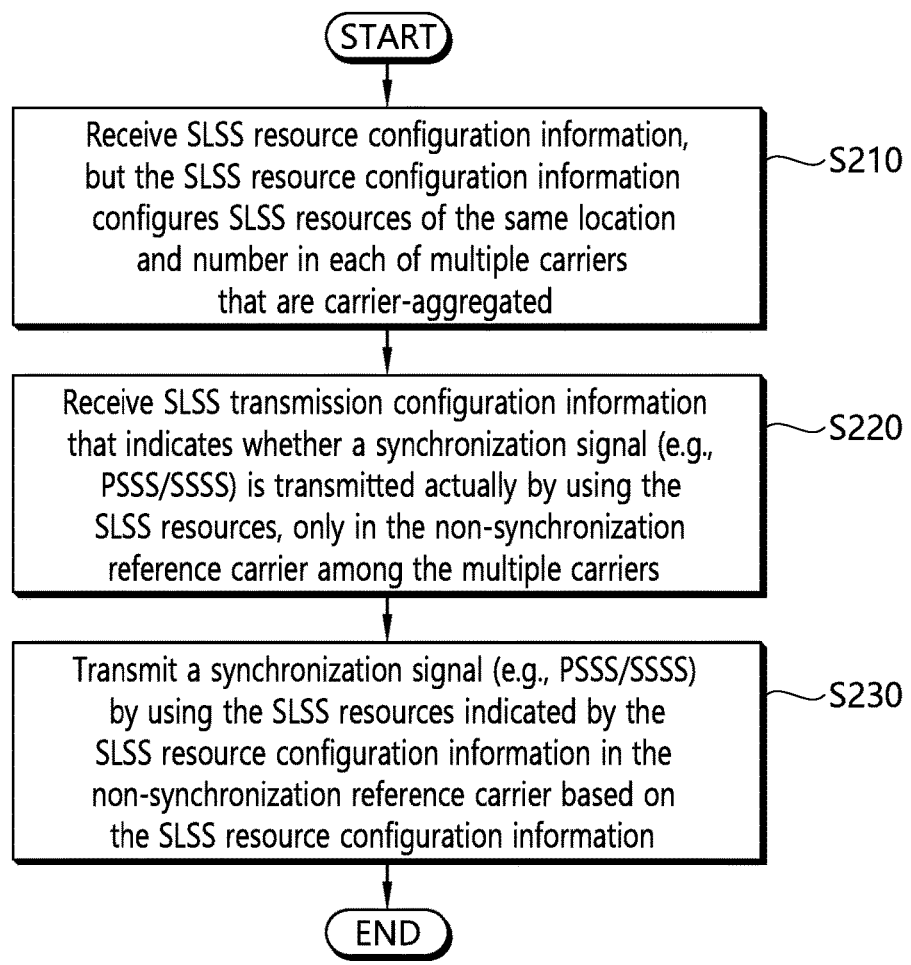
FIG. 6 illustrates an SLSS transmission method according to the present invention.

FIG. 6 illustrates an SLSS transmission method according to the present invention.

Referring to FIG. 6, a UE receives SLSS resource configuration information, but the SLSS resource configuration information may configure SLSS resources of the same location and number in each of multiple carriers that are carrier-aggregated (step, S210). As described above with reference to FIG. 5, the reason why the SLSS resources of the same location and number are configured in each of multiple carriers that are set by the carrier aggregation may be for synchronizing (sidelink) logical (subframe) indexes (and/or DFNs) between the multiple carriers.

The UE receives SLSS transmission configuration information that indicates whether a synchronization signal (e.g., PSSS/SSSS) is transmitted actually by using the SLSS resources (step, S220). More particularly, a network may indicate whether the UE perform an SLSS transmission operation actually in the corresponding SLSS resource only in the non-synchronization reference carrier (e.g., the carrier which is not a synchronization reference carrier (NON-SYNRFCC) among the multiple carriers.

The UE may transmit a synchronization signal (e.g., PSSS/SSSS) by using the SLSS resources indicated by the SLSS resource configuration information in the non-synchronization reference carrier based on the SLSS resource configuration information (step, S230). Of course, this operates only in the case that it is configured to transmit a synchronization signal in the non-synchronization reference carrier based on the SLSS resource configuration information.

The SLSS resource configuration information and the SLSS transmission configuration information may be received by being included in the same message, or received by being included in separate messages.

Figure 7:
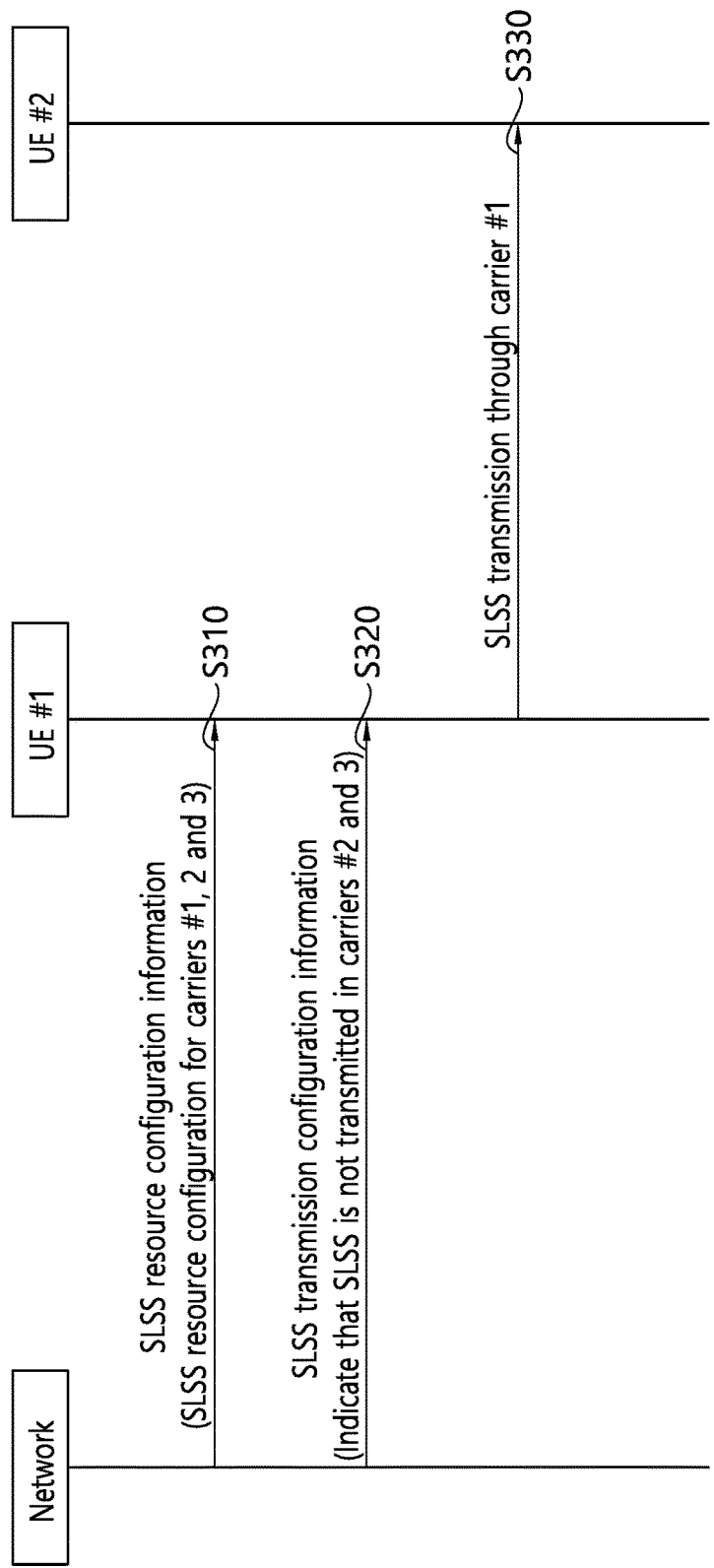
FIG. 7 illustrates a particular example to which the method described in FIGS. 5 and 6 is applied.

FIG. 7 illustrates a particular example to which the method described in FIGS. 5 and 6 is applied.

Referring to FIG. 7, a network transmits the SLSS resource configuration information to UE #1 (step, S310). The SLSS resource configuration information may setup an SLSS resource for carrier #1, 2 and 3 which is carrier-aggregated. Here, it is assumed that carrier #2 and 3 are the non-synchronization reference carriers. It is assumed that carrier #1 is the synchronization reference carrier. As described above, SLSS resources of the same location and number may be setup in the multiple carriers #1, 2 and 3 that are carrier-aggregated.

The network transmits the SLSS transmission configuration information to UE #1 (step, S320). In this case, the SLSS transmission configuration information may indicate or notify that an SLSS is not actually transmitted for carrier #2 and 3. That is, the UE may be configured with the location of SLSS resources for carrier #2 and 3, which are non-synchronization reference carriers, but configured not to transmit an SLSS.

Although it is not shown in FIG. 7, in the case that the network configures that an SLSS is actually transmitted in carrier #2 but an SLSS is not actually transmitted in carrier #3 between carrier #2 and 3, which are non-synchronization reference carriers through the SLSS transmission configuration information, according to this, the UE may transmit an SLSS in carrier #2 actually, but may not transmit an SLSS in carrier #3 actually.

UE #1 may transmit an SLSS to UE #2 through carrier #1 (step, S330). Carrier #1 is the synchronization reference carrier, and an SLSS may be transmitted on carrier #1 always when the synchronization resource is setup. Alternatively, even in the case that carrier #1 is the synchronization reference carrier, a network may configure whether an SLSS is actually transmitted. In this case, the SLSS transmission configuration information may include the information indicating whether to transmit an SLSS actually even for carrier #1, which is the synchronization reference carrier.

[Proposed method #5] In the case that there is a reserved (/selected) (transmission) resource (e.g., pattern (/location/number), period (/subframe offset), etc.) (in advance or before) on carrier #X, when reserving (/selecting) a (transmission) resource in relation to carrier #Y, an LCAP_UE may consider (/select) (only) (partial) resource which is overlapped with the reserved (/selected) (transmission) resource (on a time domain) on the (corresponding) carrier #X preferentially (or limitedly).

As an example, it is configured that the maximum number of resources that may be selected on the same TTI throughout multiple carriers may not be greater than a transmission capability (TX CAPABILITY) of a UE, for example, the number of supported transmission chains and/or power be limited to the number that does not induce a POWER-LIMITED CASE. The POWER-LIMITED CASE may mean the case that the summation of V2X message transmission powers calculated for each carrier exceeds the maximum transmission power (MAXIMUM TX POWER, e.g., 23 dBm) of the UE, in the case that V2X message transmissions on the multiple carriers are partially or entirely overlapped on a time domain.

In other words, when selecting a resource of a specific carrier (e.g., carrier #Z), the UE may exclude the TTI on which the resource selection of the corresponding maximum number is (already) completed, and (randomly) selects a resource on the remaining TTI, and then, may perform a resource selection of other carrier on the corresponding selected TTI until it reaches to a maximum allowed number.

[Proposed method #6] The CBR (/CR) (and/or remaining transmission/resource use opportunity in comparison with CR_LIMIT and/or sensing) measurement value on carrier #X which is preconfigured (/signaled) may be extendedly applied to other carrier (configured (/signaled) by the CA) (including carrier #X).

As an example, when the (corresponding) CBR (/CR) (and/or remaining transmission/resource use opportunity in comparison with CR_LIMIT and/or sensing) measurement value is extendedly applied, different (weight) ratio (/part) values may be considered for each different carriers.

As another example, in the case that the location and/or number of a synchronization signal (transmission (and/or reception)) resource is (partially) differently configured (/signaled) between different carriers that are configured (/signaled) by the CA, through application of the following rules, logical indexes (/DFNs) (in relation to V2X communication) may be synchronized between multiple carriers.

[Proposed method #7] As an example, a resource on carrier #Y (or carrier #X) (partially) overlapped with a resource location of a synchronization signal in carrier #Y (or carrier #X) may be excluded when carrier #Y (or carrier #X) logical index (/DFN) is allocated, together with (actual) synchronization signal resource in relation to carrier #Y (or carrier #X) or by configuring (/signaling) "RESERVED SUBFRAME" in relation to carrier #Y (or carrier #X) (e.g., this may mean a resource to which V2X pool logical index (/DFN) is not allocated) by assuming (/regarding) the resource as (virtual) synchronization signal resource which is additionally configure (/signaled) to carrier #Y (or carrier #X).

As another example, when cross carrier scheduling (CCS) is performed, in order to decrease the (time (/frequency)) synchronization difference (to the maximum) between a transmission (and/or reception) on carrier #X that schedules and a transmission (and/or reception) on carrier #Y that is scheduled, the cross carrier scheduling operation may be (limitedly) performed (/allowed) between V2X resource pools in which the same synchronization source type based transmission (/reception) is allowed to different carriers.

As an example, in the case that the CCS related control (/scheduling) information is transmitted subframe #N of scheduling carrier #X belonged to V2X resource pool in which a transmission based on the synchronization source type #A is allowed, (interlinked) data transmission may be performed in a nearest subframe in V2X resource pool in which a transmission based on the synchronization source type #A is allowed on carrier #Y after 4 ms (4 subframe) from subframe #N time.

For the CA, the following cases may be supported.

1) Parallel transmission of MAC PDUs. Here, the "parallel transmission" means a transmission in different carriers, which is simultaneous on different timings. In this case, the payloads of the MAC PDUs may be different with each other. 2) Parallel transmission of replicas of the same packet. 3) Capability improvement in an aspect of a receiver. In the aspect of a receiver, a simultaneous reception in multiple carriers may be assumed. In an aspect of a transmitter, a transmission may occur through carriers corresponding to subset among usable carriers. A UE may support an operation of transmission through a single carrier and also support an operation of reception through multiple carriers.

A PSCCH and an associated PSSCH may be transmitted through the same carrier. However, this does not mean exclusion that a PSCCH includes information of other carrier.

In a UE aspect, in the case that a synchronization source is independently selected in different carriers, a synchronization signal subframe may be different in the carriers, and accordingly, DFN numbers, subframe boundaries, and the like may also become different among the carriers.

In the case that the subframe boundary is the same but DFN numbers are different, location of resources that should be deferred semi-statically in the carriers may be shifted gradually. Then, a simultaneous transmission occurs in a certain subframe and an individual transmission occurs in other subframe, and accordingly, fluctuation of transmission power may occur. When a transmission power is fluctuated, a sensing operation at a receiver may be unstable.

Furthermore, in the case that subframe boundary is different between carriers, it is hard to utilize a transmission power thoroughly.

In summary, 1) in a UE aspect, when an independent synchronization source is selected between carriers, synchronization signal subframes may become different among the carriers, and as a result, the DFN numbers and the subframe boundaries may become changed in the carriers. 2) When DFN numbers are not arranged, even in the case that a UE deters resource sets in the carriers, the location of resource that should be deferred semi-statically in the carriers may be shifted. 3) When the subframe boundaries become different, it is hard to utilize a transmission power thoroughly.

In order to prevent an occurrence of the problems, it may be required to determine a sidelink synchronization anchor carrier. The sidelink synchronization anchor carrier may also be represented as the synchronization reference carrier described above.

With respect to a group of the sidelink component carriers (CCs), a common synchronization source priority configuration may be used. PSCCH/PSSCH transmission on an arbitrary sidelink CC in the group may be performed based on the synchronization reference which is selected for the sidelink synchronization anchor carrier, and SLSS/PSBCH should be performed based on the synchronization reference of the sidelink synchronization anchor carrier.

When a UE select a synchronization source in the sidelink synchronization anchor carrier, for the synchronization procedure of the existing UEs, the same SLSS/PSBCH are required to be transmitted to all CCs in the sidelink CC group.

In the case that there are only UEs operating by LTE-Rel-15, for the power efficiency, the SLSS/PSBCH may be transmitted only on the sidelink synchronization anchor carrier. There may be a plurality of sidelink synchronization anchor carriers in different services or local boundaries.

The number of asynchronous CCs transmitted/received simultaneously may be dependent upon a UE capability.

<Proposal 1> Definition of sidelink synchronization anchor carrier

With respect to a group of sidelink CCs, a common synchronization source priority configuration may be used. The synchronization reference selected for the sidelink synchronization anchor carrier may be used for PSCCH/PSSCH transmission on an arbitrary CC in the group. The SLSS/PSBCH transmission should be transmitted based on the synchronization reference selected in the sidelink synchronization anchor carrier. With respect to a group of sidelink CCs, subframe boundaries and DFN number may be aligned.

As another example, in the case that an actual its own transmission (chain) capability is smaller than the number of transmission carriers (TX CARRIERs) selected in a higher layer (e.g., APPLICATION LAYER) (e.g., the UE may be interpreted as a UE of limited transmission capability), the UE may select a specific carrier (e.g., anchor carrier, synchronization reference carrier, the highest priority carrier, etc.) which is preconfigured (/signaled) for use of the synchronization signal transmission. And/or the UE may randomly select among transmission carriers selected in a higher layer (e.g., APPLICATION LAYER), and/or may select a transmission carrier selected in a higher layer (e.g., APPLICATION LAYER) by interleaving in a time domain according to a predefined rule. And/or the UE may select a carrier on which the existing UE (LEGACY UE) is not existed and/or exclude the carrier on which only a service of an advanced UE (UE operating in accordance with LTE REL-15) is allowed and select the remaining carriers.

As another example, in the case that V2X message transmissions are partially or entirely overlapped in a time domain on multiple carriers, and/or the summation of V2X message transmission powers calculated for each carrier exceeds the maximum transmission power (MAXIMUM TX POWER, e.g., 23 dBm) of the UE (this case is referred to as POWER-LIMITED CASE), the UE may omit V2X message transmission on a part of carriers and/or decrease the power of V2X message transmission.

(Example #1) V2X message transmission of relatively low (or lower than a threshold value which is preconfigured (/signaled) PPPP (and/or service priority and/or carrier priority) (or relatively higher (/lower)) (or higher than a threshold value which is preconfigured (/signaled)) CBR (/CR) level (and/or remaining transmission/resource use opportunity in comparison with CR_LIMIT) is omitted (and/or transmission power is decreased), but an application of the corresponding transmission omitting operation (and/or transmission power decreasing operation) may be performed until the POWER-LIMITED CASE is relieved.

As a particular example, it is assumed that V2X message PPPP values on carriers #1/2/3 are PPPP #A/B/C, respectively, and the priority among the corresponding PPPPs is A>B>C. In the case that a UE may get out of the POWER-LIMITED CASE when V2X message transmission on carrier #3 of the lowest PPPP value is omitted (and/or the power is decreased), without the omission of the V2X message transmission on carrier #2 (and/or decrease of power), the V2X message transmission on the remaining carrier #1/2 may be maintained.

(Example #2) In the case that Example #1 is applied, and in the case that a part of V2X message transmissions of the same priority (e.g., in the case that PPPP, service priority, carrier priority, carrier CBR (/CR) level, remaining transmission/resource use opportunity in comparison with CR_LIMIT, resource PSSCH-RSRP (/S-RSSI) is the same) should be omitted (and/or transmission power should be decreased) in order to get out of the POWER-LIMITED CASE, (A) the UE may randomly select V2X message to omit (and/or to decrease the transmission power). And/or (B) the UE may omit the V2X message on carrier of relatively higher (/lower) (or higher (/lower) than a threshold value which is preconfigured (/signaled)) CBR (/CR) (and/or remaining transmission/resource use opportunity in comparison with CR_LIMIT) value (and/or decrease the transmission power). And/or (C) the UE may omit a periodic (or aperiodic) message transmission preferentially than aperiodic (or periodic) message transmission (and/or decrease the transmission power) and/or (D) the UE may perform (all) transmissions without the omission (and/or decrease of the transmission power), exceptionally.

(Example #3) The count information of the available count of omitting transmission consecutively (and/or decreasing power) for each priority (e.g., PPPP, service priority, carrier priority, carrier CBR (/CR) level, remaining transmission/resource use opportunity in comparison with CR_LIMIT, resource PSSCH-RSRP (/S-RSSI)) may be preconfigured (/signaled) from a network (or an eNB). In the case that the corresponding rule is applied, the problem that the V2X message transmission of relatively low priority is excessively omitted (or transmission is excessively decreased) may be alleviated.

As another example, according to the following (partial or entire) rules, (excessive) overlapping of a resource (re) selection on multiple carriers may be avoided (and/or HALF-DUPLEX problem may be alleviated (simultaneously)).

The corresponding rule may be limitedly applied to (A) the case that a UE should transmit V2X message on carriers which is configured (/signaled) by a higher layer of which capability is relatively greater than its own transmission (chain) capability (and/or in the case of securing a transmission chain switching time (between different carriers) and performing resource selection considering it), (B) the case of avoiding the POWER-LIMITED CASE, (C) the case of alleviating HALF DUPLEX problem in relation to INTRA-BAND CA, and the like.

A resource selection in relation to a specific carrier in the present invention may be limitedly or additionally performed only in a selectable transmission candidate resource set which is determined by a sensing operation (e.g., excluding high interference resource).

(Example #1) Basically, a resource (re)selection for each carrier is randomly (or independently) performed in an order which is preconfigured (/signaled). However, after the number (this is referred to as NUM_OV) of overlapping carrier(s) resources for TTI of which selection is completed before is counted, in the case that the NUM_OV on TTI satisfies a predefined condition, the corresponding TTI may be excluded from the resource selection for the corresponding specific carrier, and randomly selected among the resource on the remaining TTI.

The UE may also randomly select the resource on the TTI of relatively smaller (or greater) NUM_OV value among the remaining TTI(s) that are not excluded.

The condition may be defined as below. Here, for example, when resource is (re)selected on a specific carrier, the K number of TTIs (e.g., K=1) which is in front of and/or behind the carrier(s) resource(s) of which selection is completed before may be additionally excluded (e.g., used for transmission chain switching time).

(1) The case that NUM_OV is the same as a transmission capability (e.g., supported number of transmission chains) of a UE (2) The case that the remainder of transmission power budget (TX POWER BUDGET) restriction (or the maximum transmission power of the UE) subtracted by the summation of transmission power in relation to NUM_OV is unable to allow (/support) additional simultaneous transmission (on the corresponding TTI) without causing the POWER-LIMITED CASE.

Figure 8:
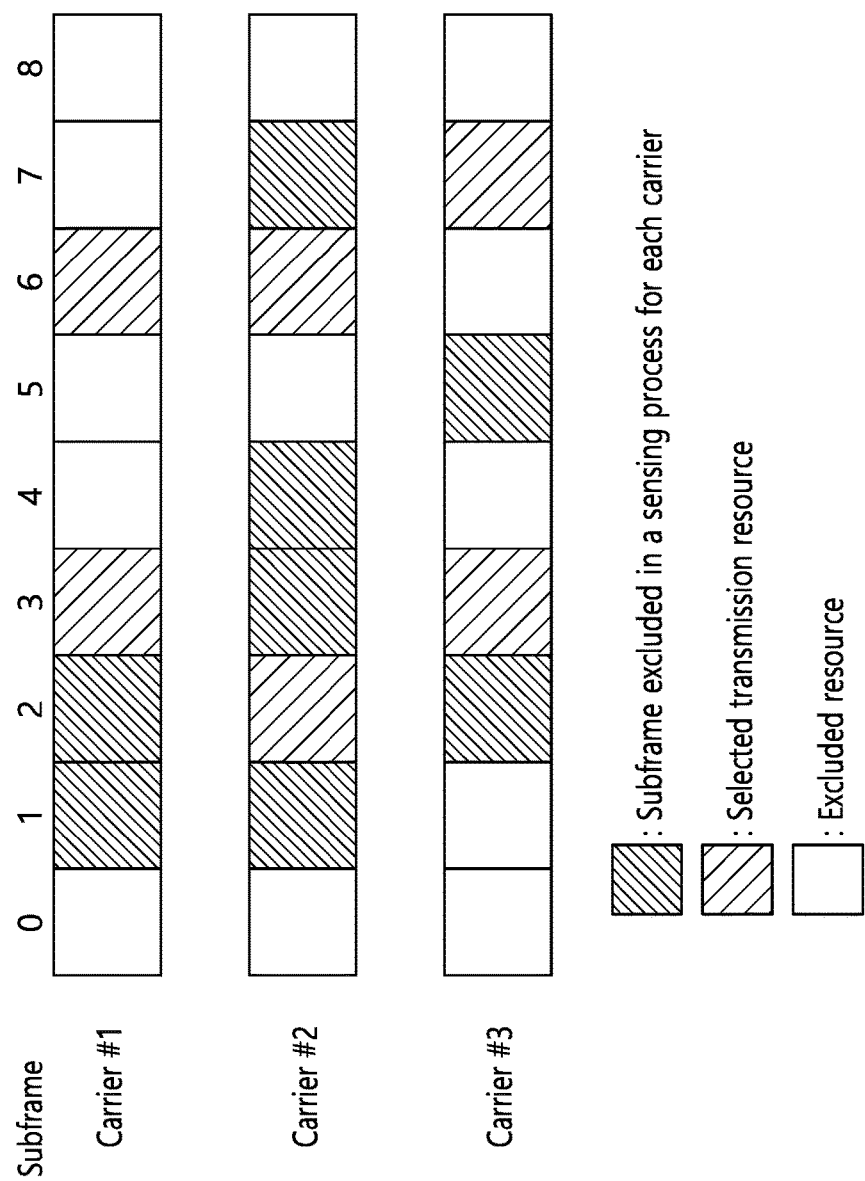
FIG. 8 illustrates an example (option 1-1) of resource selection for each carrier in the case that the carrier aggregation is used in V2X transmission.

FIG. 8 illustrates an example (option 1-1) of resource selection for each carrier in the case that the carrier aggregation is used in V2X transmission.

Referring to FIG. 8, it is assumed that carriers #1, 2 and 3 are configured to a UE by the carrier aggregation for V2X communication and the UE is a UE provided with only two transmission chains. That is, it is assumed that the UE has a capability of transmitting V2X signal only to two carriers simultaneously.

In this case, the UE may exclude a part of resources (e.g., subframes) from a candidate resource selection for V2X communication in sensing procedure of each carrier. For example, the UE may exclude the resource of which PSSCH-RSRP measurement value is greater than a preconfigured threshold value or of which S-RSSI measurement value is relatively high simultaneously while the resource is a resource reserved by other UE. FIG. 8 exemplifies the case that the resource (e.g., subframe) is excluded during the sensing process that subframes 1 and 2 are excluded in carrier #1, subframes 1, 3, 4 and 7 are excluded in carrier #2, and subframes 2 and 5 are excluded in carrier #3 during the sensing process.

The UE may select a resource for V2X communication for each carrier according to a predefined carrier order or configured carrier order (e.g., the UE may receive V2X configuration information, and the V2X configuration information may indicate to select a transmission resource in the order of the first carrier and the second carrier). In this case, the carrier resource selection order may be defined by considering ProSe priority per packet (PPPP), CBR, and so on. For example, it is assumed that the UE selects resource for V2X communication in the order of carriers #1, 2 and 3.

First, it is assumed that the UE selects subframes 3 and 6 (e.g., random selection) among subframes that are not subframe excluded in the sensing process, in carrier #1. Next, the UE selects a resource for V2X communication among subframes that are not subframe excluded in the sensing process, in carrier #2, and in this case, the UE considers the selected resource for V2X communication of the carrier that completes the resource selection previously, that is, carrier #1. For example, since the transmission capability of the UE is not exceeded (i.e., transmittable in two carriers simultaneously) even in the case that the UE selects subframe 6 in carrier #2, the UE selects subframe 6 of carrier #2. Similarly, the UE may also select subframe 2 of carrier #2.

Next, the UE selects a resource for V2X communication among subframes that are not subframe excluded in the sensing process, in carrier #3, and the UE considers the selected resources for V2X communication of the carriers that complete the resource selection previously, that is, carrier #1 and carrier #2. For example, since the transmission capability of the UE is exceeded (i.e., transmittable in two carriers simultaneously) in the case that the UE selects subframe 6 of carrier #3, the UE selects a resource for V2X communication among the remaining subframes except subframe 6 of carrier #3. Since the transmission capability of the UE is not exceeded (i.e., transmittable in two carriers simultaneously) even in the case that the UE selects subframe 3 in carrier #3, the UE selects subframe 3 of carrier #3. Similarly, the UE may also select subframe 7 of carrier #3.

Figure 9:
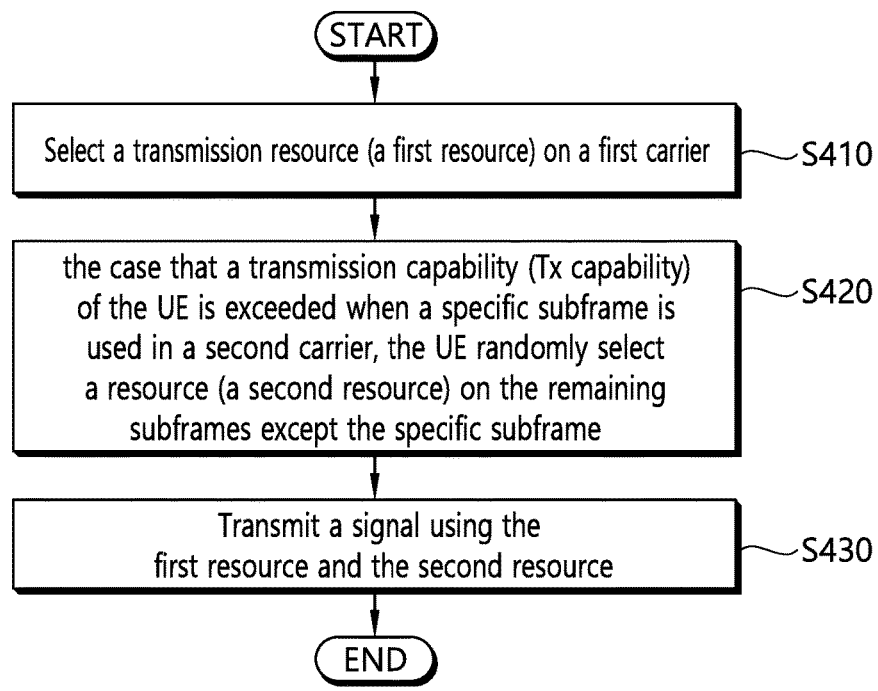
FIG. 9 illustrates a resource selection method performed by a UE according to option 1-1 described above.

FIG. 9 illustrates a resource selection method performed by a UE according to option 1-1 described above.

Referring to FIG. 9, a UE selects a transmission resource (a first resource) on a first carrier (step, S410). In the case that a transmission capability (Tx capability) of the UE is exceeded when a specific subframe is used in a second carrier by considering the first resource, the UE randomly select a resource (a second resource) on the remaining subframes except the specific subframe (step, S420).

For example, in the specific subframe, the number of transmission chains in the UE may be less than the number of configured transmission carriers. Alternatively, in the specific subframe, the UE may not support a frequency band combination including the first resource of the first carrier and the third resource of the second carrier. Alternatively, the specific subframe may correspond to a transmission chain switching time of the UE.

The UE may transmit a signal using the first resource and the second resource (step, S430). The signal may be V2X signal. The UE may apply option 1-1 described above to the case a) the number of transmission chains is less than the number of configured transmission carriers, b) the UE does not support a given band combination, or c) the subframe corresponds to a transmission chain switching time.

In addition, the UE may follow option 1-2 that will be described below in other cases (e.g., the UE fails to satisfy RF requirement due to the reason such as PSD imbalance in the subframe).

Figure 10:
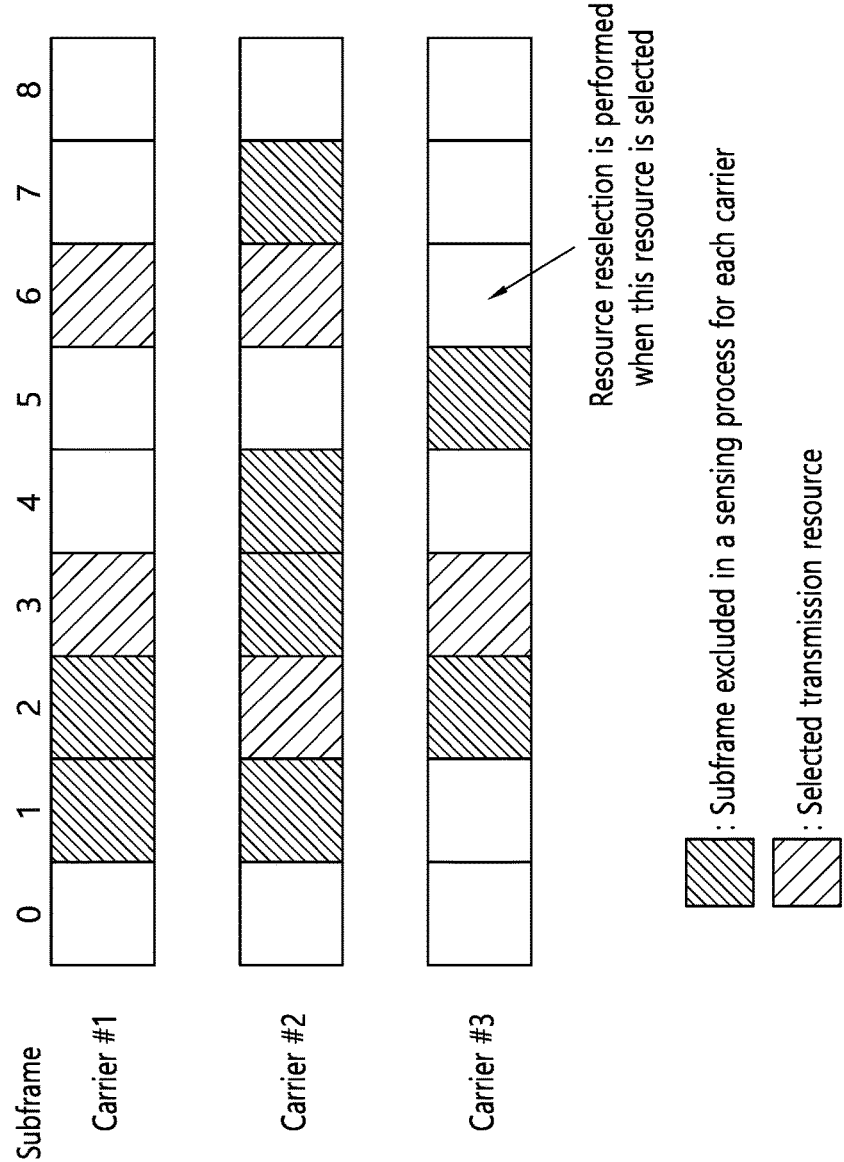
FIG. 10 illustrates another example (option 1-2) of a resource selection for each carrier in the case that the carrier aggregation is used in V2X communication.

FIG. 10 illustrates another example (option 1-2) of a resource selection for each carrier in the case that the carrier aggregation is used in V2X communication.

Referring to FIG. 10, it is assumed that carriers #1, 2 and 3 are configured to a UE by the carrier aggregation for V2X communication and the UE is a UE provided with only two transmission chains. That is, it is assumed that the UE has a capability of transmitting V2X signal only to two carriers simultaneously.

The UE may select a resource for V2X communication for each carrier according to a predefined carrier order or configured carrier order. In this case, the carrier resource selection order may be defined by considering ProSe priority per packet (PPPP), CBR, and so on. As a result, for example, it is assumed that the UE independently selects resource for V2X communication in the order of carriers #1, 2 and 3.

First, the UE may select subframes 3 and 6 (e.g., random selection) among subframes that are not subframe excluded in the sensing process, on carrier #1. Next, the UE may randomly select a resource for V2X communication among subframes that are not subframe excluded in the sensing process, in carrier #2. At this time, in the case that the resource randomly selected with respect to carrier #2 exceeds the transmission capability of the UE itself (considering a selected resource for V2X communication of the carrier that completes the resource selection previously), the UE may repeat the random resource selection with respect to carrier #2 until the resource that does not exceed the transmission capability is selected. As a result, for example, subframes 2 and 6 may be selected on carrier #2.

Next, the UE may select (e.g., randomly select) a resource for V2X communication with respect to carrier #3. At this time, it is assumed that the UE selects subframes 3 and 6 on carrier #3 (in random way). In this case, the selected resource does not exceed the transmission capability (i.e., transmittable in two carriers simultaneously) of the UE in subframe 3, but exceeds the transmission capability (i.e., transmittable in two carriers simultaneously) of the UE in subframe 6. In this case, the UE may (randomly) reselect a resource on carrier #3 until a subframe that does not exceed the transmission capability of the UE is selected. That is, the UE repeats the resource reselection on carrier #3 until the transmission resource that the UE is supportable is selected.

According to option 1-1, when a UE selects a transmission resource on a specific carrier, in the case that the UE selects a specific subframe in the specific carrier and the subframe exceeds the transmission capability limit of the UE considering the resource reserved (selected) on other carrier, the UE (randomly) selects among the remaining subframes except the specific subframe. According to option 1-2, when a UE selects a transmission resource on a specific carrier, in the case that the UE selects a (random) resource (e.g., subframe) preferentially and the result of the corresponding resource selection exceeds the transmission capability limit of the UE considering the resource reserved (selected) on other carrier, the UE repeats a transmission resource reselection (e.g., randomly) with respect to the corresponding specific carrier until the transmission resource that the UE may support is selected.

Figure 11:
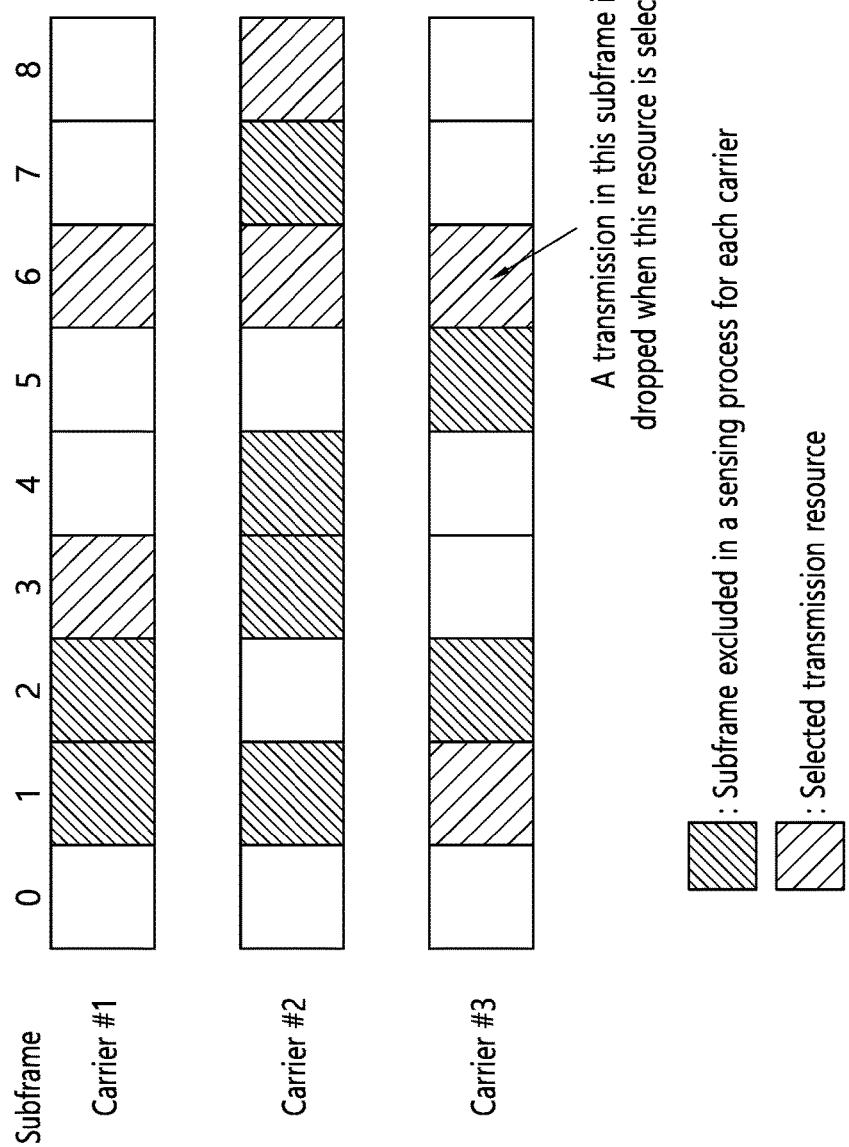
FIG. 11 illustrates another example (option 2) of a resource selection for each carrier in the case that the carrier aggregation is used in V2X communication.

FIG. 11 illustrates another example (option 2) of a resource selection for each carrier in the case that the carrier aggregation is used in V2X communication.

Referring to FIG. 11, it is assumed that carriers #1, 2 and 3 are configured to a UE by the carrier aggregation for V2X communication and the UE is a UE provided with only two transmission chains. That is, it is assumed that the UE has a capability of transmitting V2X signal only to two carriers simultaneously. The UE may select a resource for V2X communication for each carrier according to a predefined carrier order or configured carrier order. In this case, the carrier resource selection order may be defined by considering ProSe priority per packet (PPPP), CBR, and so on.

For example, it is assumed that the UE selects resource for V2X communication in the order of carriers #1, 2 and 3. At this time, the UE may perform a resource selection for V2X communication independently for each carrier on each of carrier #1, 2 and 3. As a result, for example, it is assumed that the UE selects subframes 3 and 6 on carrier #1, and selects subframes 6 and 8 on carrier #2 and selects subframes 1 and 6 on carrier #3. In this case, although subframe 6 is selected on all of carriers #1, 2 and 3, the UE cannot perform a transmission for three carriers simultaneously in subframe 6 of carriers #1, 2 and 3. That is, in subframe 6, it exceeds the transmission capability (i.e., transmittable in two carriers simultaneously) of the UE. In this case, in option 2, all of the transmissions in subframe 6 may be dropped, or only a transmission of relatively low priority which is predefined (e.g., transmission of low PPPP or transmission of high CBR on a carrier) may be dropped so as not to exceed the transmission capability of the UE.

Meanwhile, the 'limited transmission capability of a UE' may mean the case that a UE is unable to support (simultaneous) transmission with respect to multiple carriers in a specific subframe owing to the following reasons (a) to (d), particularly.

(a) The case that the number of transmission chain (Tx chain) of the UE is smaller than the number of transmission carriers configured in the subframe, (b) The case that the UE does not support a given band combination or carrier combination in the subframe, (c) The case that the subframe corresponds to a transmission chain switching time, (d) The case that the UE is unable to satisfy RF requirement owing to the reason such as power spectrum density (PSD) imbalance in the subframe.

Option 1-1 described in FIG. 8 may be applied to cases (a), (b) and (c). With respect to case (d), in the case that it exceeds the transmission capability when using a certain subframe, the UE may drop the transmission in the corresponding subframe.

Alternatively, option 1-1 is applied to cases (a), (b) and (c), and with respect to case (d), the UE may repeat a resource reselection in a candidate resource set until a transmission resource that satisfies the transmission capability is selected.

Alternatively, option 1-2 may be applied to cases (a), (b) and (c), and option 2 may be applied to case (d).

Alternatively, option 1-1 may be applied to cases (a), (b), (c) and (d).

Alternatively, option 1-2 may be applied to cases (a), (b), (c) and (d).

Alternatively, option 2 may be applied to cases (a), (b), (c) and (d).

Alternatively, option 1-1 may be applied to cases (a), (b) and (c), and option 1-2 may be applied to other cases.

(Example #2) In example #1, a resource selection order among carriers may be (A) defined by a carrier priority described above which is preconfigured (/signaled) and/or (B) defined by the highest (/lowest) PPPP value of a V2X message transmitted on a carrier and/or (C) defined by a carrier index and/or (D) defined in a descending (/or ascending) order based on a CBR (/CR) measurement (and/or remaining transmission/resource use opportunity in comparison with CR-LIMIT) value, and the like and/or (E) randomly defined and/or (F) defined to preferentially select a carrier (in the same band) (or synchronization reference (SYNCH. REFERENCE) carrier) that does not require a transmission chain switching (time/gap).

As another example, for a resource selection order among carriers, the carrier in which a message transmission of relatively short (or long) generation (/transmission/resource reservation) period (and/or high (low) RELIABILITY REQUIREMENT and/or low (or high) LATENCY REQUIREMENT is performed may be preferentially selected.

The rule described above may be extendedly applied to the options (e.g., option 1-1, option 1-2, etc.) described above.

(Example #3) When example #1 is applied, considering a transmission chain switching time occurrence problem owing to a limited transmission capability (and/or half duplex problem (in relation to intra band CA)), in the case that the number of carrier(s) resources overlapped for each TTI in which selection is completed does not satisfy a predefined condition, the resource on the corresponding TTI (in which the resource selection is already completed) may be selected preferentially until satisfying the predefined condition (e.g., in a direction that carrier(s) resource(s) is selected on the same TTI to the maximum), and/or the K number of TTIs in front of and/or behind carrier(s) resource(s) in which selection is completed may be excluded from the resource selection for carrier (such an excluded resource may be used for a transmission chain switching time).

(Example #4) When example #4 is applied, in the case that there is no remaining TTI that satisfies a predefined condition when a resource in relation to a specific carrier is selected, (A) a V2X message transmission on the corresponding carrier may be omitted, or (B) in the case that a V2X message transmission of a value of lower than (or the same as) the PPPP in relation to a V2X message on the corresponding carrier is performed on other carrier (or a V2X message transmission is performed on the carrier of low (or the same) value in comparison with the priority of the corresponding carrier, or a PPPP value in relation to a V2X message transmission on the corresponding carrier is higher than a preconfigured (/signaled) threshold value, or a priority of the corresponding carrier is higher than a preconfigured (/signaled) threshold value, etc.), a selection of the resource overlapped with a selected/reserved resource on other carrier on a time axis may be allowed (e.g., in order to prevent a V2X message transmission of PPPP value which is relatively high value (or a V2X message transmission on a carrier having relatively high priority) being omitted. In the case that latter (B) condition is not satisfied and it is unable to perform it, a V2X message transmission on the corresponding carrier may be omitted.

In the case that (a part or the entire) proposed techniques of the present invention are applied, the following carrier resource selection may be performed.

With respect to a given MAC PDU, a single carrier may be provided for transmitting it by a higher layer. In the transmission carrier selection, the following factors may be considered: 1) CBR, 2) UE capability (e.g., the number of transmission chains, power budget sharing capability, transmission chain retuning capability, etc.).

With respect to a given MAC PDU, a single carrier is used for a transmission of the MAC PDU and a potential retransmission. When a carrier is selected, until a resource reselection is triggered with respect to the same sidelink process, the selected carrier is used for all MAC PDUs in the same sidelink process. However, change of a transmission chain between carriers (CCs) is not excluded for different sidelink processes.

In mode 4 CA, a carrier selection rule and a resource selection procedure will be described. The transmission carrier selection may be efficiently performed by considering a load balancing and a UE capability between carriers, and it may be prevented a negative influence on an accuracy of sensing process owing to excessive dynamic transmission carrier switching.

Figure 12:
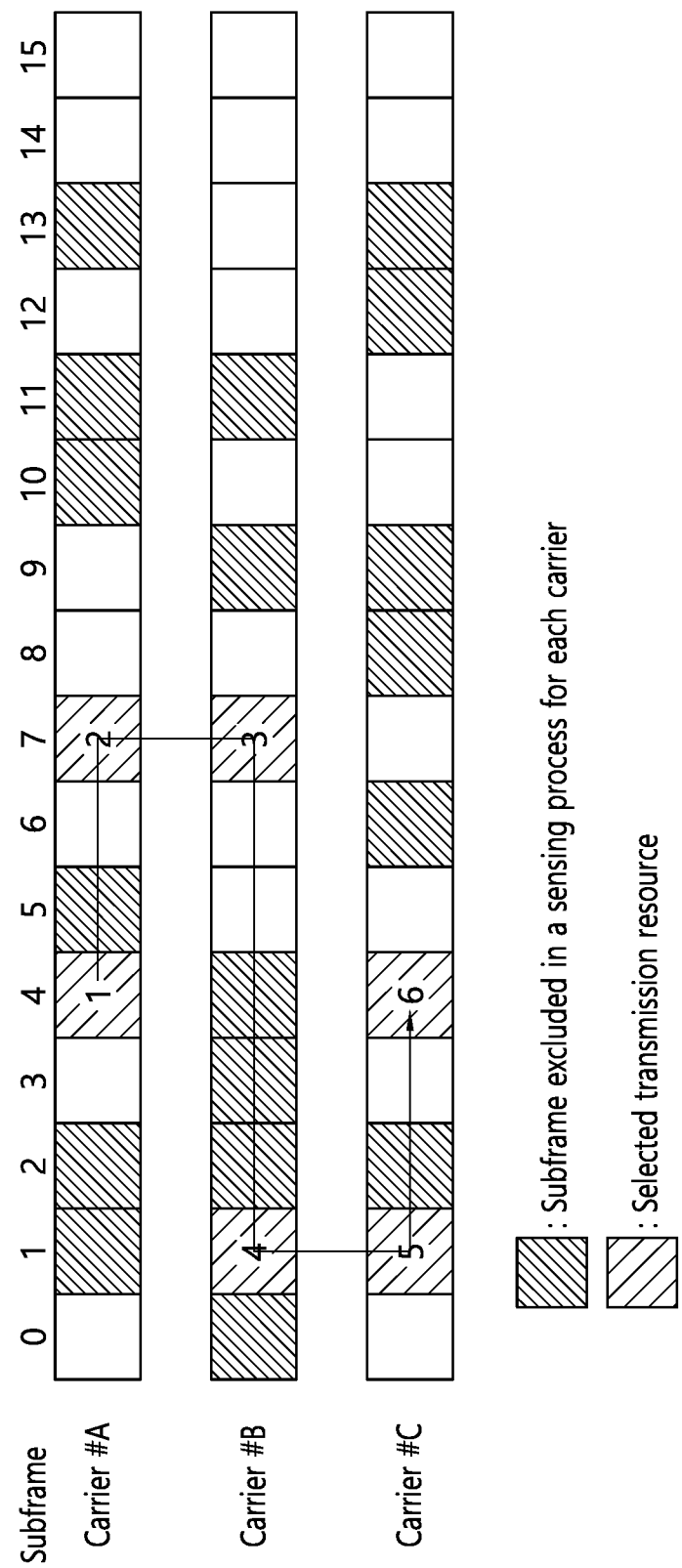
FIG. 12 illustrates an example of a resource selection in the case that the CA is applied in sidelink.

FIG. 12 illustrates an example of a resource selection in the case that the CA is applied in sidelink.

Referring to FIG. 12, a UE performs a resource selection in carrier #A (a first carrier).

When the UE performs a resource selection with respect to a certain carrier, any subframe that satisfies one of the following conditions may be excluded from a candidate resource.

1) In the case that a count of simultaneous transmission reaches to a transmission capability of the UE in a subframe, the corresponding subframe, 2) in the case that a remaining transmission power budget is in short of allowing an additional simultaneous transmission in the subframe, the corresponding subframe, and 3) A subframe that should be used for a transmission chain switching time.

Such subframes are excluded from the candidate resource, and the subframes selected for a transmission already in the steps are prioritized.

In FIG. 12, it is assumed that the UE has a transmission capability of performing simultaneous transmission in two carriers, and transmission power budget or switching time is not considered, for the convenience of description.

In FIG. 12, the subframe shown in grey-color is a subframe determined to have no usable resource through a sensing process for each carrier.

First, the UE may select subframes #4 and 7 in random selection scheme in carrier #A. Next, the UE performs a resource selection in carrier #B, and in this case, subframe #7 may be selected. Since the UE has a transmission capability of performing a transmission on two carriers simultaneously, this may be a selection within the transmission capability of the UE. The UE is unable to select subframe #4 in carrier #B because the corresponding subframe is excluded from a sensing process. Accordingly, the UE may randomly select subframe #1, for example.

In carrier #0, the UE may select subframes #1 and 4 as a transmission subframe. The UE is unable to select subframe #7 in carrier #B because the transmission capability limit of the UE is already reached.

In a UE complexity (standard/test aspect or implementation) for reducing half duplex problem, a simpler method may also be considered.

In this method, first, 1) In the case that a count of simultaneous transmission reaches to a transmission capability of the UE in a subframe, the corresponding subframe, 2) in the case that a remaining transmission power budget is in short of allowing an additional simultaneous transmission in the subframe, the corresponding subfame, and the like are also excluded. Later, the UE may randomly select a resource among the remaining resources (resources that are not excluded in the sensing process for each carrier or resources that are not additionally excluded in a series of carrier resource selection procedure).

For example, in the example of FIG. 12, in carrier #C, subframe 7 is excluded, but the resource selection is not limited in subframes #1 and 4. That is, another subframe (e.g., subframe 0) may be selected.

As another example, when a UE selects a transmission carrier used for a MAC PDU transmission in relation to a specific service generated in a potential transmission (/reception) carrier set provided by a higher layer, after examining conditions in the order of 1) service type of a MAC PDU, 2) transmission capability of the UE, and 3) carrier CBR (or priority) (e.g., it may be interpreted that a priority is configured (/signaled) among the considered conditions, when selecting a transmission carrier), and the UE may finally select a transmission carrier proper for it.

As another example, when (a part or the entire) proposed methods of the present invention are applied, a transmission chain switching operation (and/or transmission chain switching gap (/time)) may use at least one of (A) TTI that is not configured (/signaled) by SLSS resource, (B) TTI in which resource pool bitmap is not applied (e.g., deferred subframe), (C) TTI of which transmission resource reservation (/selection) is not performed, (D) TTI in which a message transmission (/reception) of a PPPP value higher than a preconfigured (/signaled) threshold value is not performed, (E) TTI in which transmission is performed, preferentially or limitedly.

As another example, when (a part or the entire) proposed methods of the present invention are applied, in the case that a UE fails to perform a reception (and/or sensing) operation on a specific TTI owing to (reception) interruption in relation to a transmission chain switching operation, by assuming that a resource reservation is performed based on all interval candidate values that are allowed in advance by another UE on the corresponding TTI, and an exclusion operation (and/or resource (re)selection operation) of a candidate resource (e.g., subframe) which is overlapped (in a selection window).

As another example, when (a part or the entire) proposed methods of the present invention are applied, a UE may perform (/trigger) a transmission resource (re)selection (/reservation) operation simultaneously, in a unit of carrier group preconfigured (/signaled) from a network (or an eNB) (e.g., this may be interpreted as a sort of "MULTI-CARRIER SYNCHRONIZED RESOURCE (RE)SELECTION (/TRIGGERING) PROCEDURE", and this may be referred to as MCCSYN_RESEL.).

Here, for example, a reference carrier in relation to MCCSYN_RESEL may be defined as at least one of (A) a preconfigured (/signaled) carrier from a network (or an eNB), (B) an anchor (/reference) carrier in relation to synchronization, (C) a carrier of which carrier priority preconfigured (/signaled) is relatively high (or low), (D) a carrier of which PPPP value of a transmitted (or to be transmitted) V2X message is relatively high (or low) (or a carrier on which a message transmission of relatively short (or long) generation (/transmission/resource reservation) period (and/or high (low) reliability requirement and/or low (or high) latency requirement) is performed. (E) a carrier of which carrier index is relatively high (or low), (F) a carrier of which CBR (/CR) measurement (and/or remaining transmission/resource use opportunity in comparison with CR_LIMIT) value is relatively high (or low).

As an example, it may be interpreted that the (remaining) carrier(s) belonged to the same MCCSYN_RESEL carrier group (except reference carrier) shares resource (re)selection triggering timer (/counter) (of reference carrier), and so on.

As another example, in the case that a resource (re) selection operation of a specific carrier belonged to the MCCSYN_RESEL carrier group is triggered, when (re) selecting a resource in relation to the corresponding carrier, a overlapping number (this is referred to as OV_RSC) for each TTI of the remaining carrier(s) resource(s) belong to the same MCCSYN_RESEL carrier group is counted. In the case that the OV_RSC on a specific TTI satisfies a predefined condition, the corresponding TTI may be excluded, and resources on the remaining TTI may be randomly selected.

The corresponding condition may be defined as the case that the OV_RSC is the same as or greater than a transmission capability (e.g., the number of supported transmission chains) of a UE and/or the case that the OV_RSC induces a POWER-LIMIT CASE. As another example, the MCCSYN_RESEL carrier group may be identically configured (/signaled) to the carrier group that shares (time/frequency) synchronization based on an (specific) anchor (/reference) carrier.

As another example, when (a part or entire) proposed methods of the present invention are applied, a retransmission resource in relation to a specific carrier may be selected with a TTI contiguous with an initial transmission resource as available for a UE. Here, as an example, when the corresponding rule is applied, it may be alleviated that a transmission chain switching gap (/time) occurs (excessively) between an initial transmission and a retransmission (in the case that a switching to another transmission carrier is (inevitably) performed since a time gap (/difference) is great).

As another example, when (a part or entire) proposed methods of the present invention are applied, resource selections in relation to difference carriers may be performed in contiguous TTIs for a UE. This is, for example, designed to alleviate an occurrence of half duplex problem/excessive transmission chain switching time (/gap).

As another example, when (a part or entire) proposed methods of the present invention are applied, in the case that a UE performs an actual SLSS transmission (/reception) operation in a preconfigured (/signaled) SLSS resource on a specific carrier (e.g., synchronization reference carrier) (and/or in the case that a preconfigured (/signaled) SLSS resource is existed on a specific carrier), the K number of TTIs (e.g., K=1) which is in front of and/or behind the corresponding SLSS resource may be excluded from a resource selection (/allocation) on (other) carrier (e.g., used for transmission chain switching time). In the case that the corresponding rule is applied, (under an intra-band CA situation) a synchronization signal transmission (/reception) operation and a PSCCH/PSSCH transmission (/reception) operation may be efficiently performed on different carriers. The SLSS resource may be extendedly interpreted to "transmission of a preconfigured (/signaled) specific channel/signal (or a message of PPPP value which is higher than a preconfigured (/signaled) threshold value)" or "transmission of channel/signal on a preconfigured (/signaled) specific carrier (or channel/signal of a carrier priority which is higher than a preconfigured (/signaled) threshold value)".

As another example, when (a part or entire) proposed methods of the present invention are applied, as a resource selection order among carriers, a UE may perform a carrier of a (channel/signal/message) transmission in which relatively high power is required (/allocated) (and/or LONG COVERAGE REQUIREMENT) (and/or high reliability requirement and/or low latency requirement) preferentially.

In the case that the corresponding rule is applied, when allocating (/calculating) a (channel/signal/message) transmission power on different carriers (under an intra-band CA situation), in the case that a (channel/signal/message) transmission power on a previously allocated carrier is needed to be reduced (owing to excess of MPR or PSD IMBALANCE allowance limit (considering IMD PRODUCT)), a transmission on the corresponding carrier may be omitted (or a transmission is performed on other carrier in which a transmission power on a previously allocated carrier is not needed to be reduced (or does not exceed MPR or PSD IMBALANCE allowance limit).

As another example, when (a part or entire) proposed methods of the present invention are applied, a UE may perform a synchronization signal monitoring (and/or transmission) operation in a preconfigured (/signaled) SLSS resource on a synchronization reference carrier according to a preconfigured (/signaled) rule (/pattern/ratio) (e.g., period, subframe offset).

The corresponding synchronization signal monitoring (and/or transmission) operation may be (A) limitedly performed only in the case of not performing a PSCCH/PSSCH transmission operation on a non-synchronization reference carrier (NON-SYNRFCC), and/or (B) perform by omitting a PSCCH/PSSCH transmission on a non-synchronization reference carrier (NON-SYNRFCC), and/or (C) performed in a UE IMPLEMENTATION form.

As another example, when (a part or entire) proposed methods of the present invention are applied, a UE should exclude subframe(s) (on carrier #X) owing to the reason such as a transmission (chain) capability limit arrival, a transmission limit case occurrence, prevention of occurrence of unable to excessive reception/monitoring due to half duplex problem, when a UE performs resource (re)selection/reservation for specific carrier #X, and for this, it is required to clarify the assumption that a time/an extent of a resource reservation of exiting other carrier(s) on which resource selection/reservation is performed already which is maintained (or validated). This is because it is determined whether the same time/frequency positioned resource is continuously used based on a preconfigured (/signaled) probability wherever a resource reselection operation is triggered, with respect to a selected/reserved resource on a carrier, generally. That is, on the (re)selection/reservation performing timing in relation to carrier #X, the probabilistic determination for resource (location) change of the (existing) other carrier(s) on which resource selection/reservation is already performed (and/or resource reselection/reservation operation) is not always performed/triggered together.

As a method for solving this includes, for example, (A) it is assumed that a resource reservation on the existing different carrier(s) is maintained (or valid) during a preconfigured (/signaled) time duration (/length) (or during infinite time (/length)), or (B) the probabilistic determination for (future) resource (location) change of the existing other carrier(s) is performed when (re)selection/reservation for carrier #X is performed (together or in advance) (or when performing a resource selection/reservation of the corresponding carrier(s)), or (C) it is assumed that a resource of the existing other carrier(s) is maintained (for a time or temporarily) (e.g., virtually, it may be interpreted that the probabilistic determination result may maintain the existing resource (location), or (D) it is assumed that a resource reservation on the existing other carrier(s) is maintained (or valid) until a resource reservation counter (e.g., resource reselection/reservation is triggered when a resource selection/reservation counter becomes "0") expires (or as much as a preconfigured (/signaled) multiples of a resource reservation counter).

As another example, a UE may select a (transmission) carrier having remaining transmission/resource use opportunity in comparison with CR_LIMIT (e.g., CR_LIMIT value may be differently configured (/signaled) for each CBR/PPPP (from a network)) which is higher (/lower) than a preconfigured (/signaled) threshold value, for a carrier used for a packet transmission of a specific PPPP value.

Here, for example, in the case that there is a plurality of (transmission) carriers that has remaining transmission/resource use opportunity in comparison with CR_LIMIT which is higher (/lower) than a corresponding threshold value, a UE may randomly select one of these. Here, for example, the corresponding threshold value may be differently configured (/signaled) for each PPPP and/or CBR and/or carrier priority and/or service type (/sort).

Generally, CBR (/CR) measurement operation is performed whenever (actual) initial transmission or retransmission is performed. However, for the UE that has a limited transmission capability, carriers on which actual initial/retransmission is not performed for a while may be occurred, and the CBR (/CR) value (in relation to the corresponding carrier) used after switching to such a carrier is a measured value before a relatively longer time (i.e., a value measured when (actual) initial transmission or retransmission is performed previously on the corresponding carrier), and may not properly reflect a latest state (e.g., load) in relation to the corresponding carrier. In order to alleviate the corresponding problem, in the case that switching allowance from carrier #X (e.g., carrier used for a current V2X message transmission) to carrier #Y (switching target carrier) is allowed only on the time when resource reselection/reservation of carrier #X is triggered, the CBR (/CR) measurement for carrier #Y may be (additionally) performed based on resource reselection/reservation triggering time of carrier #X (or preconfigured (/signaled) period from a network).

As another example, in the case of a UE that has a limited transmission capability, the UE may perform a resource selection for a specific carrier according to Table below. In the case that a subframe (combination) that does not satisfy a predefined condition on the corresponding carrier(s) (e.g., subframe (combination) which is not reached to a transmission capability (/transmission limit case) is not remained (in a selection window) when selecting a resource in relation to (specific) carrier(s), according to a specific technique in the Table below (e.g., option 1-2 and/or option 1-1), (A) a resource reselection operation may be (repeatedly or limitedly) performed as much as preconfigured (/signaled) (maximum) count, and/or (B) a resource selection operation (/procedure) in relation to the corresponding carrier(s) may not be performed (/started) (or omitted) (this may prevent a resource reselection operation for a specific carrier(s) from being repeated excessively (or infinitely).). Here, for example, when latter (B) rule is applied, it may be interpreted that the transmission operation in relation to the corresponding carrier(s) is omitted. The Table below summarizes options in FIGS. 8 to 11.

TABLE 1

With respect to a given MAC PDU, a single carrier may be provided for the transmission by a higher layer. In a transmission carrier selection, the following factors may be considered: 1) CBR, 2) UE capability (e.g., the number of transmission chains, power budget sharing capability, transmission chain retuning capability, etc.).

With respect to a given MAC PDU, a single carrier is used for a transmission of the MAC PDU and a potential retransmission.

When a carrier is selected, until a resource reselection is triggered with respect to the same sidelink process, the selected carrier is used for all MAC PDUs in the same sidelink process. However, change of a transmission chain between carriers (CCs) is not excluded for different sidelink processes.

The 'limited transmission capability' means that a UE is unable to support a transmission in a subframe of carrier(s) owing to the following reasons (a) to (d).
  (a) The case that the number of transmission chain of the UE is smaller than the number of transmission carriers configured,
  (b) The case that the UE does not support a given band combination,
  (c) The case that the subframe corresponds to a transmission chain switching time,
  (d) The case that the UE is unable to satisfy RF requirement owing to the reason such as PSD imbalance.

A UE that has the limited transmission capability may operate according to the following option for a resource selection in mode 4 CA.
  <Option 1-1>
  When a UE performs a resource selection with respect to a certain carrier, (under a resource reservation in other carrier) in the case that using a certain subframe exceeds the transmission capability limit of the UE, the certain subframe is excluded in a candidate resource set. The order of carrier resource selection may be determined by considering PPPP, CBR, and the like of a transmission.
  <Option 1-2>
  When an independent resource selection is performed for each carrier, in the case that a transmission is caused, which exceeds a transmission capability of a UE, the UE may perform a resource reselection repeatedly in a given candidate resource set until the transmission resources that the UE is supportable are selected. The order of carrier resource selection may be determined by considering PPPP, CBR, and the like of a transmission.
  <Option 2>
  This is a method, after performing an independent resource selection for each carrier; a transmission is dropped for a subframe that exceeds a transmission capability limit.

Option 1-1 described above may be applied to cases (a), (b) and (c), and with respect to case (d), in the case that using a certain subframe exceeds the transmission capability, the UE may drop of a transmission in the certain subframe.

Alternatively, option 1-1 is applied to cases (a), (b) and (c), and with respect to case (d), the UE may repeat a resource reselection in a candidate resource set until a transmission resource that satisfies the transmission capability is selected.

Alternatively, option 1-2 described above may be applied to cases (a), (b) and (c), and option 2 may be applied to case (d).

Alternatively, option 1-1 may be applied to cases (a), (b), (c) and (d).
Alternatively, option 1-2 may be applied to cases (a), (b), (c) and (d).
Alternatively, option 2 may be applied to cases (a), (b), (c) and (d).

The standard for the CA applied in V2X may also be applied to a reception of non-contiguous carriers.

The (b) above may include a carrier combinations as well as band combination which is not supported. In the case that the UE having a limited transmission capability is unable to support a transmission through carriers, the UE may follow option 1-1 for cases (a), (b) and (c), or may follow option 1-2.

As another example, when option 1-2 in Table 1 is applied, in the case that only a part (e.g., 1) of multiple (e.g., 2) (random) selection resources for a specific carrier exceeds a transmission capability of a UE, the UE may (A) repeat a resource reselection only for the corresponding partial number of selection resources until a resource selection which does not exceed the transmission capability is completed, or (B) repeat a resource reselection for all of multiple selection resources (in relation to the corresponding carrier) until a resource selection which does not exceed the transmission capability is completed.

As another example, in the case of a UE that has a limited transmission capability, when performing a transmission carrier switching, (RF chain) RETUNING time may be required. In order to reduce the corresponding (RF chain) RETUNING time overhead, (A) when the UE select a transmission carrier, the UE maintains the carrier until (after an initial transmission) retransmission is performed (or until a preconfigured (/signaled) number (or time duration) of transmissions are performed, or (B) when the UE select a resource for a specific carrier, the UE may exclude subframe(s) between an initial transmission of other carrier and a retransmission (or a duration during which a preconfigured (/signaled) number of transmission on other carrier is performed (or time duration of a length which is preconfigured (/signaled)). Here, for example, the latter method (B) may be (limitedly) applied only when an interval between an initial transmission and a retransmission is less than a preconfigured (/signaled) threshold value.

As another example, in the case of a UE that has a limited transmission capability, when performing a resource selection for a specific carrier #X, a determination of excluding subframe #N on carrier #X for the use of (RF chain) RETUNING time (e.g., assumed as "1 subframe") may be performed (A) in the case that, before subframe #N of carrier #X, a resource selection (or transmission) on the number of other carrier(s) that corresponds to the number of transmission capability limits of the UE itself is performed and the latest (or the last) resource (or transmission) on the corresponding other carrier(s) is located in subframe #N−1 (or in the case that the resource selection is not located before the time that requires (RF chain) RETUNING time from subframe #N), subframe #N is determined to be the use of (RF chain) RETUNING time, and excluded from the resource selection in relation to carrier #X.

As a particular example, it is assumed that a UE of "the number of transmission capability limits=2" and "the number of configured carriers=3". At this time, in the case that resource selections (or transmissions) on carrier #1 and carrier #3 are performed on subframe #N−1 and subframe #N−2, respectively, subframe #N on carrier #2 is determined to be the use of (RF chain) RETUNING time, and should be excluded from the resource selection in relation to carrier #X. On the other hand, in the case that resource selections (or transmissions) on carrier #1 and carrier #3 are performed on subframe #N−1 and subframe #N−6, respectively, the UE is able to switch from subframe #N−4 to carrier #2, subframe #N may not be necessarily excluded from the resource selection in relation to carrier #X.

As another example, in the case that a plurality of (intra-band) carriers is configured (/signaled) by the CA, owing to the half duplex problem (i.e., in the case of performing a transmission (or reception) operation on the timing of subframe #N on a specific carrier, it is unable to perform a reception (or transmission) operation) on the same (or partially overlapping) timing on other carrier(s)), within a selection window on a specific carrier on which resource (re)selection/reservation operation is triggered, and in the case that preconfigured (/signaled) number (e.g., 20% of total candidate resource number in a selection window) of candidate resources is not secured (or in the case that there is no remaining candidate resources), (without additional action for increasing the number of candidate resources) the transmission resource selection operation may be performed using only the remaining candidate resources (or resource reselection operation is triggered by including other carrier (s) in which resource selection/reservation is completed).

Here, as an example, in the case that a specific subframe #P is failed to be monitored/received owing to half duplex problem, and the like, it may be assumed that (all of) candidate (transmission) resource within a selection window that may be overlapped (or collided) with a resource may be excluded, which is apart from subframe #P as much as one (and/or the number of preconfigured (/signaled) count of) (candidate) resource reservation period.

As another example, in the case that (intra-band) CA is configured (/signaled), and in the case that (transmission) resources of a plurality of carriers are overlapped on a specific subframe, a transmission power reduction in relation to a part or all carriers (for example, a transmission coverage reduction may occur) may be inevitable owing to excess of MPR or PSD IMBALANCE allowance limit (considering IMD PRODUCT).

By considering this, V2X message transmissions of different carrier(s) (partially) overlapped in time domain may be limited to those of PPPP values less than a preconfigured (/signaled) threshold value.

On the contrary, a V2X message transmission having a PPPP value of the corresponding threshold value or greater is performed on subframe #K of a specific carrier, when a resource in relation to a V2X message (e.g., message having a PPPP value of the corresponding threshold value or smaller) on different carrier is selected/reserved, only the remaining subframe(s) except the corresponding subframe #K may be (limitedly) considered (or a V2X message transmission on a specific carrier having a PPPP value of the corresponding threshold value or greater may not (partially) overlapped with a V2X message transmission resource on a different carrier on a time domain (or (limitedly) allowed to (partially) overlap with a V2X message transmission resource on a different carrier of the (maximum) number of preconfigured (/signaled) on a time domain).

As another example, an influence (e.g., LEAKAGE) due to PSD IMBALANCE between different (intra-band CA) carriers may be changed according to a location (and/or number) of (scheduled) resource block, and so on. Accordingly, when a UE performs a resource selection/reservation for a specific carrier, in the case that any one of candidate resources is unable to satisfy PSD IMBALANCE allowance limit (without transmission power reduction) when using any one of candidate resources on a specific subframe in a selection window (or a preconfigured (/signaled) number or more), the UE may (randomly) select among the remaining (candidate resources on the subframe) except the corresponding subframe.

As another example, when option 2 described in the Table is applied, in the case that the number of selection resources in relation to a plurality of carriers on a specific TTI is greater than a transmission capability of the UE (and/or a transmission in relation to a plurality of carriers on a specific TTI causes a power limit case), the UE may omit the transmission in relation to the carrier on the corresponding TTI based on a descending (or ascending) order of the remaining transmission/resource use opportunity in comparison with CR_LIMIT.

The omission of a transmission relation to a carrier on the corresponding TTI may be performed until the number of selection resources in relation to a plurality of carrier on the corresponding TTI becomes smaller than or equal to a transmission capability of the UE (and/or a transmission relation to a plurality of carrier on the corresponding TTI does not cause a power limit case.

As another example, when a resource selection (/reservation) for a specific carrier is performed, together with a candidate resource exclusion operation (e.g., a resource occupied by another UE or a resource of high interference is excluded) (in a selection window) based on a sensing operation (e.g., S-RSSI measurement, PSSCH-RSRP measurement), after (additional) candidate resource exclusion operation (in a selection window) considering the transmission capability excess problem described above (and/or reception stop occurrence problem owing to a power limit case arrival problem and/or a half duplex problem and/or a transmission chain switching problem), in the case that there is not remaining candidate resource in the selection window (and/or in the case that the number (e.g., 20% of the number of entire candidate resources in a selection window) of preconfigured (/signaled) candidate resources is not secured, (A) a transmission in relation to the corresponding carrier is performed on an EXCEPTIONAL RESOURCE POOL which is preconfigured (/signaled) (once, or during a preconfigured (/signaled) count (/time), or the number of selectable candidate resources in a selection window is secured until preconfigured (/signaled) threshold value or greater), and/or (B) a switching/resource selection (/reservation) is performed on a carrier (e.g., may be limited to an identical service (/priority) carrier) on which relatively many candidate resources are existed (in a selection window), and/or (C) (including the existing carrier on which resource selection (/reservation) is completed) resource reselection may be triggered.

As another example, when (transmission) carrier selection is performed (in a preconfigured (/signaled) potential (transmission) carrier set), in the case of a specific (transmission) carrier, together with a transmission capability excess problem (in a selection window) based on a sensing operation, after (additional) candidate resource exclusion operation (in a selection window) considering (described above) (and/or reception stop occurrence problem owing to a power limit case arrival problem and/or a half duplex problem and/or a transmission chain switching problem), in the case that there is not remaining candidate resource in the selection window (and/or in the case that the number (e.g., 20% of the number of entire candidate resources in a selection window) of preconfigured (/signaled) candidate resources is not secured, (A) the corresponding (TX) carrier may be excluded from a selection candidate, and/or (B) a priority in relation to (transmission) carrier selection may be defined based on an descending (or ascending) order of the remaining number of candidate resources in a selection window.

As another example, a resource selection priority between carriers on which a message transmission of the same PPPP (and/or service) is performed (and/or having the same CBR and/or CR and/or remaining transmission/resource use opportunity in comparison with CR_LIMIT) (A) may be randomly defined, or (B) may be defined in an descending (or ascending) order of carrier indexes (and/or CR and/or remaining transmission/resource use opportunity in comparison with CR_LIMIT).

As another example, when a resource selection (/reservation) for a carrier is performed, when it is determined that a specific candidate resource in a selection window has a transmission capability excess problem (and/or reception stop occurrence problem owing to a power limit case arrival problem and/or a half duplex problem and/or a transmission chain switching problem) (e.g., the corresponding candidate resource is (additionally) excluded if there is such a problem), (A) only a corresponding candidate resource (time) location (subframe #N) in a selection window is considered, or (B) (as well as the corresponding candidate resource (time) location (subframe #N), a resource (time) location(s) (e.g., subframe #(N+P) of a resource reservation period (P) of (HOP_NUM) may be considered once (or infinite count or preconfigured (signaled) count or (selected) resource reservation counter count (e.g., when resource selection/reservation counter becomes "0", a resource reselection/reservation is triggered)) (based on subframe #N).

In the case that the latter (B) rule is applied, a probability that the corresponding candidate resource undergoes the problem described above may be relatively decreased future. Here, for example, "HOP_NUM" may be (partially or entirely) differently configured (/signaled) according to PPPP (/service type) (and/or CBR (/CR) and/or remaining transmission/resource use opportunity in comparison with CR_LIMIT and/or carrier priority and/or latency (/reliability) requirement and/or whether to (HARQ) retransmit.

As another example, in the case of a UE having limited reception capability (e.g., in the case that the number of reception chains is smaller than the number of configured reception carriers), a sensing operation is not performed more than a time length threshold which is preconfigured (/signaled) on a specific carrier owing to a carrier switching operation, and the like, (A) a message transmission (in relation to a specific carrier) may be omitted until a sensing result of the corresponding time length threshold is secured, and/or (B) a resource selection/reservation and a message transmission may be performed (on a specific carrier) by using a limited sensing result (e.g., this may be interpreted as a sort of PARTIAL SENSING operation, and/or (C) (until a sensing result of the corresponding time length threshold is secured) a message transmission based on a random resource selection may be performed (on a specific carrier), and/or (D) (until a sensing result of the corresponding time length threshold is secured) a preconfigured (/signaled) exceptional resource pool may be used.

As another example, in the case that a resource selection (/reservation) for a specific carrier #X is performed, together with a candidate resource exclusion operation (in a selection window) based on a sensing operation, in the case that a message transmission of (relatively or) higher (than a preconfigured (/signaled) threshold value) PPPP is reserved on different carrier #Y, this may be (additionally) excluded in a selection window in relation to carrier #X. Here, for example, when the corresponding rule is applied, since a message transmission resource of (relatively) low PPPP on carrier #X is overlapped with a message transmission resource of (relatively) high PPPP on carrier #Y (in a time domain), the problem may be alleviated that the message transmission of the corresponding (relatively) low PPPP is omitted or the power is reduced.

As another example, in the case that a physical layer (PHY LAYER) forwards remaining candidate resource (information) (in a selection window) to a MAC layer after performing (additional) candidate resource exclusion operation (this is referred to as EXC_PRC#B) (in a selection window) considering a transmission capability excess problem (and/or reception stop occurrence problem owing to a power limit case arrival problem and/or a half duplex problem and/or a transmission chain switching problem), and the like (described above) as well as a candidate resource exclusion operation (this is referred to as EXC_PRC#A) (in a selection window) based on a sensing operation, preconfigured (/signaled) "condition of securing the number of candidate resources (e.g., 20% of total number of candidate resources in a selection window)" (in a selection window) in relation to (existing) EXC_PRC#A may not be applied.

Since the examples for the proposed methods described above may also be included in implementation methods of the present invention, it is apparent that the examples for the proposed methods may be regarded as a sort of proposed methods. In addition, the proposed methods described above may be independently implemented, but may also be implemented as a combination (or merge) form.

For example, although the proposed method is described on the basis of a 3GPP LTE/LTE-A system for convenience of explanation, a system to which the proposed method is applied may also be extended to another system other than the 3GPP LTE/LTE-A system. For example, the proposed methods of the present invention may also be extendedly applied for D2D communication. Herein, the D2D communication implies that a UE communicates with a different UE directly by using a radio channel Herein, although the UE implies a user terminal, when a network device such as an eNB transmits and/or receives a signal according to a communication scheme between UEs, the UE may also be regarded as a sort of the UE.

In addition, the proposed methods of the present invention may be limitedly applied only to mode 3 V2X operation (and/or mode 4 V2X operation).

In addition, the proposed methods of the present invention may be limitedly applied only to a preconfigured (/signaled) (specific) V2X channel (/signal) transmission (e.g., PSSCH (and/or (interlinked) PSCCH and/or PSBCH)).

In addition, the proposed methods of the present invention may be limitedly applied only to the case that a PSSCH and a (interlinked) PSCCH are adjacently (and/or non-adjacently) transmitted (on a frequency domain) (and/or a transmission based on a preconfigured (/signaled) MCS (and/or coding rate and/or resource block) (value (/range)) is performed).

In addition, the proposed methods of the present invention may be limitedly applied only to mode #3 (and/or mode #4) V2X carrier (and/or (mode #4 (/3) sidelink (/uplink) SPS (and/or sidelink (/uplink) dynamic scheduling) carrier).

In addition, the proposed methods of the present invention may be (limitedly) applied only to the case that a synchronization signal (transmission (and/or reception)) resource location and/or the number (and/or subframe location in relation to V2X resource pool and/or the number (and/or sub channel size and/or the number) are identical (and/or (partially) different).

In addition, the proposed methods of the present invention may be extendedly applied when a UE having a transmission (chain) capability which is smaller than the number of transmission carriers (configured by a higher layer) (re) selects a resource for each carrier as well as a UE of limited capability.

Figure 13:
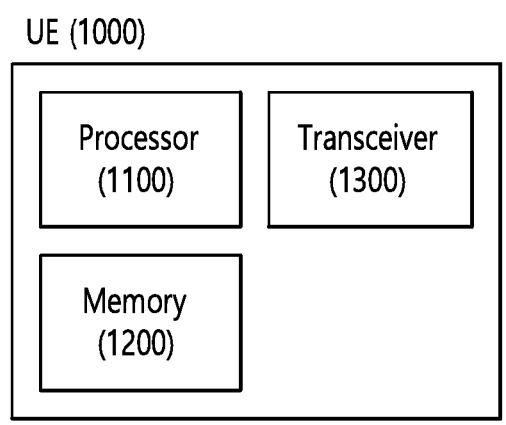
FIG. 13 is a block diagram of an apparatus in which the embodiment of the present invention is implemented.

FIG. 13 is a block diagram of an apparatus in which the embodiment of the present invention is implemented.

Referring to FIG. 13, an apparatus 1000 includes a processor 1100, a memory 1200 and a transceiver 1300. The processor implements a proposed function, process and/or method. The apparatus 1000 may be a UE or an eNB. The transceiver 1300 is connected with the processor 1100 and transmits/receives a radio signal. The memory 1200 may store information required for an operation of the processor 1100, and may also store a transmission/reception signal.

Figure 14:
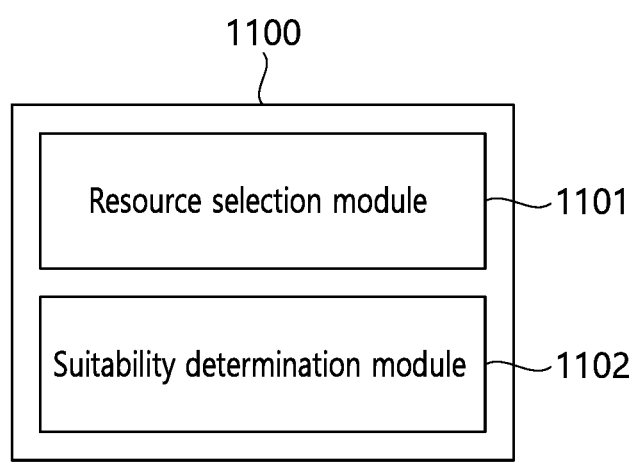
FIG. 14 illustrates an example of configuring a processor 1100.

FIG. 14 illustrates an example of configuring a processor 1100.

Referring to FIG. 14, the processor 1100 may include a resource selection module 1101 and a suitability determination module 1102. The resource selection module 1101 may select a transmission resource for a V2X signal transmission for each carrier. The suitability determination module 1102 may include a CP remove module for removing a cyclic prefix (CP) from a reception signal, a Phase Rotation module for rotating a phase, a Fast Fourier Transform (FFT) module, a channel estimation (CE) module, a single input multiple output (SIMO) decoder, an inverse discrete Fourier transform (IDFT) module, a log-likelihood ratio (LLR) calculation module, a de-scrambling module, a decoder chain, and so on.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

The invention claimed is:

1. A method for transmitting a vehicle-to-everything (V2X) signal performed by a user equipment (UE) having a limited transmission capability in a multi-carrier system, comprising:
    selecting a first resource in a first carrier;
    if using a specific subframe in a second carrier exceeds a transmission capability of the UE considering the first resource, selecting a second resource randomly among the remaining subframes except the specific subframe in the second carrier; and
    transmitting the V2X signal using the first resource and the second resource,
    wherein a number of transmission chains for the UE is smaller than a number of configured transmission carriers in the specific subframe.

2. The method of claim 1, wherein the UE does not support a frequency band combination including the first resource of the first carrier and the second resource of the second carrier in the specific subframe.

3. The method of claim 1, wherein the specific subframe corresponds to a transmission chain switching time of the UE.

4. The method of claim 1, further comprising: receiving V2X configuration information,
    wherein the V2X configuration information indicates that a transmission resource is selected in an order of the first carrier and the second carrier.

5. The method of claim 1, wherein the UE select a transmission resource in an order of the first carrier and the second carrier based on a channel busy ratio (CBR) and a ProSe priority per packet (PPPP) of the V2X signal.

6. The method of claim 1, wherein the first carrier and the second carrier are configured to the UE by carrier aggregation.

7. A user equipment (UE), comprising:
    a transceiver configured to transmit and receive a radio signal; and
    a processor operated in connection with the transceiver, wherein the processor is configured to perform:
    selecting a first resource in a first carrier;
    if using a specific subframe in a second carrier exceeds a transmission capability of the UE considering the first resource, selecting a second resource randomly among the remaining subframes except the specific subframe in the second carrier; and
    transmitting the V2X signal using the first resource and the second resource,
    wherein a number of transmission chains for the UE is smaller than a number of configured transmission carriers in the specific subframe.

8. The UE of claim 7, wherein the UE does not support a frequency band combination including the first resource of the first carrier and the second resource of the second carrier in the specific subframe.

9. The UE of claim 7, wherein the specific subframe corresponds to a transmission chain switching time of the UE.

10. The UE of claim 7, wherein the UE receives V2X configuration information,
    wherein the V2X configuration information indicates that a transmission resource is selected in an order of the first carrier and the second carrier.

11. The UE of claim 7, wherein the UE select a transmission resource in an order of the first carrier and the second carrier based on a channel busy ratio (CBR) and a ProSe priority per packet (PPPP) of the V2X signal.

12. The UE of claim 7, wherein the first carrier and the second carrier are configured to the UE by carrier aggregation.

* * * * *